(12) United States Patent
Jensen

(10) Patent No.: US 10,348,382 B1
(45) Date of Patent: Jul. 9, 2019

(54) LOW PROBABILITY OF INTERCEPT RADIO-FREQUENCY SYSTEM USING BEAMFORMING TECHNIQUES

(71) Applicant: Rockwell Collins, Inc., Cedar Rapids, IA (US)

(72) Inventor: Dana J. Jensen, Marion, IA (US)

(73) Assignee: ROCKWELL COLLINS, INC., Cedar Rapids, IA (US)

(*) Notice: Subject to any disclaimer, the term of this patent is extended or adjusted under 35 U.S.C. 154(b) by 0 days.

(21) Appl. No.: 15/991,894

(22) Filed: May 29, 2018

(51) Int. Cl.
*H04B 7/06* (2006.01)
*H04B 1/04* (2006.01)

(52) U.S. Cl.
CPC ............ *H04B 7/0617* (2013.01); *H04B 1/04* (2013.01)

(58) Field of Classification Search
CPC ...... H04B 1/1036; H04B 1/7093; H04B 1/04; H04B 7/0617; H04K 3/28; H04K 3/228; H04J 13/00
See application file for complete search history.

(56) References Cited

U.S. PATENT DOCUMENTS

| 2008/0232434 A1* | 9/2008 | Yang | H04B 1/7093 |
| | | | 375/140 |
| 2010/0289688 A1* | 11/2010 | Sherman | H04B 1/1036 |
| | | | 342/16 |

* cited by examiner

*Primary Examiner* — Raymond S Dean
(74) *Attorney, Agent, or Firm* — Donna P. Suchy; Daniel M. Barbieri

(57) ABSTRACT

Systems and methods of preventing interception of radio-frequency (RF) signals can include a first transmitter device (cover signal generator) and a second transmitter device (protected signal generator). The first transmitter device may have a first set of antennae to transmit a first RF signal in plurality of directions. The first RF signal may have a first signal strength in a target direction less than in directions adjacent to the target direction. The second transmitter device may have a second set of antennae to transmit a second RF signal to a target receiver according to an interception prevention configuration. The interception prevention configuration may include having the target receiver located along the target direction and the second RF signal having a second signal strength greater than a detection threshold relative to the first signal strength along the target direction.

20 Claims, 9 Drawing Sheets

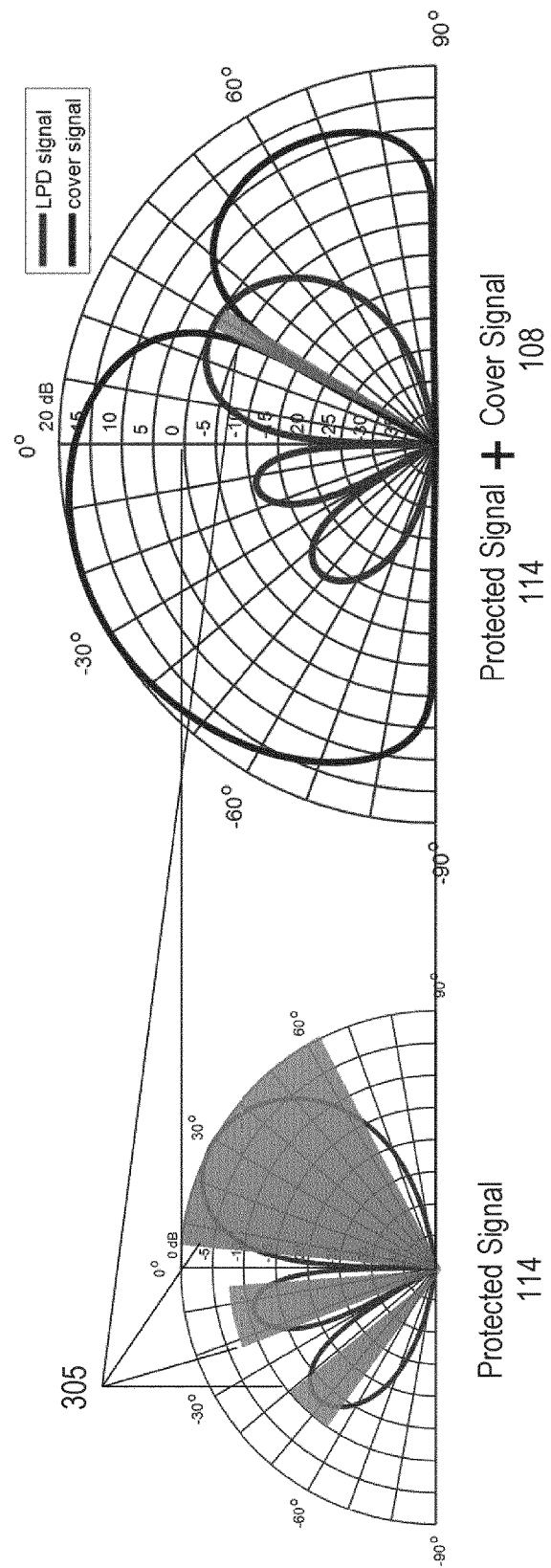

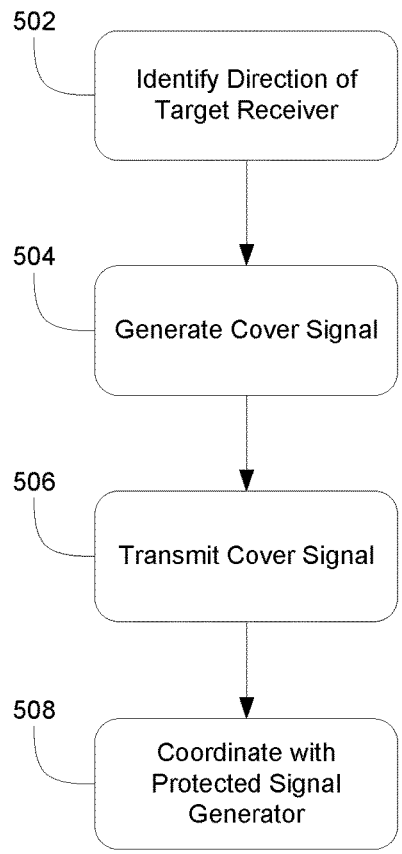
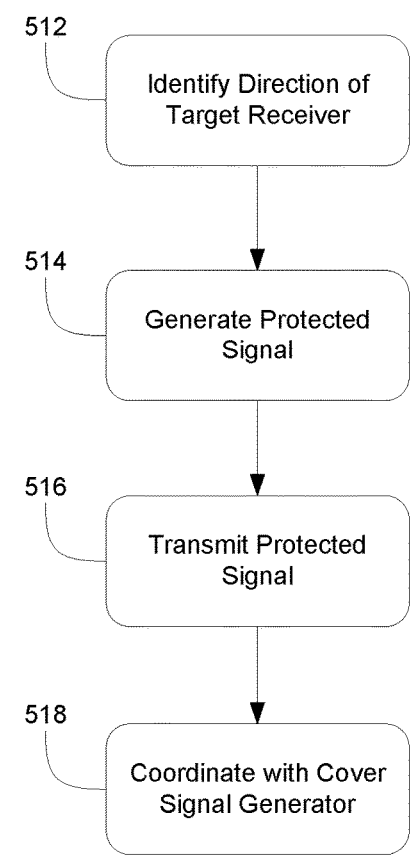
FIG. 5A
FIG. 5B

LOW PROBABILITY OF INTERCEPT RADIO-FREQUENCY SYSTEM USING BEAMFORMING TECHNIQUES

BACKGROUND

Radiofrequency (RF) communication may be intercepted by entities besides the intended recipient. Directional RF transmissions may be less vulnerable to interception than omnidirectional RF transmissions. But advanced receiver configurations employed by such entities may make hiding directional RF transmissions difficult.

SUMMARY

In one aspect, embodiments of the inventive concepts disclosed herein are directed to a system for preventing interception of radiofrequency (RF) signals. The system may include a first transmitter device. The first transmitter device may have a first set of antennae. The first set of antennae may transmit a first RF signal in plurality of directions. The first RF signal may have a first signal strength in a target direction less than in directions adjacent to the target direction. The system may include a second transmitter device. The second transmitter device may have a second set of antennae. The second set of antennae may transmit a second RF signal to a target receiver according to an interception prevention configuration. The interception prevention configuration may include having the target receiver located along the target direction and the second RF signal having a second signal strength greater than a detection threshold relative to the first signal strength along the target direction.

In some embodiments, the first transmitter device may transmit the first RF signal according to the interception prevention configuration to provide interference to a second receiver different from the target receiver to prevent the second receiver from intercepting the second RF signal. In some embodiments, the first transmitter device may determine the target receiver along the target direction and to generate the first RF signal having the first signal strength in the target direction according to the interception prevention configuration based on the determination of the target receiver in the target direction. In some embodiments, the second transmitter device may determine the target receiver along the target direction and to generate the second RF signal having the second signal strength in the target direction according to the interception prevention configuration based on the determination of the target receiver in the target direction.

In some embodiments, the first transmitter device may detect, subsequent to the transmission of the first RF signal, a second target receiver along a second target direction and to modify the first RF signal having a third signal strength in the second target direction less than in direction adjacent to the second target direction. In some embodiments, the system may include third transmitter device. The third transmitter device may have a third set of antennae. The third set of antennae may transmit a third RF signal to a second target receiver according to the interception prevention configuration. The interception prevention configuration may include having the second target receiver located along the second target direction and the third RF signal having a fourth signal strength greater than a second detection threshold relative to the third signal strength along the second target direction.

In some embodiments, the second transmitter device may dither the second RF signal to set the second signal strength of the second RF signal to be less than the detection threshold relative to the first RF signal for a predetermined period of time in accordance with the interception prevention configuration. In some embodiments, the first transmitter device and the second transmitter device are co-located.

In a further aspect, embodiments of the inventive concepts disclosed herein are directed to a transmitter device for preventing interception of radiofrequency (RF) signals. The transmitter device may include a control circuit having one or more processors and memory. The control circuit may identify a target receiver located along a target direction. The control circuit may generate a first RF signal having a first signal strength greater than a detection threshold relative to a second signal strength of a second RF signal generated by a cover signal generator device along the target direction according to an interception prevention configuration. The second RF signal may have the second signal strength in the target direction less than in directions adjacent to the target direction. The transmitter device may include a transceiver circuit coupled to the control circuit. The transceiver circuit may transmit, via a set of antennae, the first RF signal to the target receiver located along the target direction.

In some embodiments, the control circuit may transmit the first RF signal according to the interception prevention configuration to provide data to the target receiver located along the target direction to prevent a second receiver located outside the target direction from intercepting the second RF signal. In some embodiments, the control circuit may determine a change in direction of the target receiver different from the target direction and to modify the first RF signal based on the change of direction according the interception prevention configuration. In some embodiments, the control circuit may determine a target area in which the target receiver is located and may identify the target direction for transmission of the first RF signal based on the target area. The first RF signal may have the first signal strength greater than a second detection threshold relative to the second signal strength within the target area.

In some embodiments, the control circuit may receive the target direction for transmission of the first RF signal from a central coordinator device according to the interception prevention configuration. In some embodiments, the control circuit may identify a signal property of the second RF signal and may modify at least one of a modulation, a frequency, or a timing the first RF signal according to the interception prevention configuration based on the signal property of the second RF signal. In some embodiments, the transceiver circuit may transmit, via the set of antennae, the first RF signal. The first RF signal may include at least one of an omnidirectional signal or a directional signal.

In further aspect embodiments of the inventive concepts disclosed herein are directed to a transmitter device for preventing interception of radiofrequency (RF) signals. The transmitter device may include a control circuit having one or more processors and memory. The control circuit may identify a target receiver located along a target direction. The control circuit may generate a first RF signal having a first signal strength less than a second signal strength of a second RF signal by a detection threshold generated by a protected signal generator device along the target direction according to an interception prevention configuration. The transmitter device may include a transceiver circuit coupled to the control circuit. The transceiver circuit may transmit, via a set of antennae, the first RF signal. The first signal may have the first signal strength along the target direction less than along a plurality of directions adjacent to the target direction.

In some embodiments, the control circuit may transmit the first RF signal according to the interception prevention configuration to provide interference to a second receiver different from the target receiver to prevent the second receiver from intercepting the second RF signal. In some embodiments, the control circuit may determine an avoidance direction along which a second receiver different from the target receiver is located and modify the first RF signal based on the avoidance direction.

In some embodiments, the control circuit may determine a target area in which the target receiver is located and identify the target direction for transmission of the first RF signal based on the target area. The first RF signal may have the first signal strength less than the second signal strength within the target area by the detection threshold. In some embodiments, the control circuit may identify a signal property of the second RF signal and may modify at least one of a modulation, a frequency, or a timing the first RF signal according to the interception prevention configuration based on the signal property of the second RF signal. In some embodiments, the transceiver circuit may transmit, via the set of antennae, the first RF signal. The first RF signal may include a directional signal having one or more lobes and one or more minima. At least one of the minima may have the first signal strength.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 3A and 3B show polar diagrams of radiation patterns emitted by a cover signal generator device and a protected signal generator device of the system for preventing interception of RF signals, in accordance with some embodiments of the inventive concepts disclosed herein;

FIGS. 5A and 5B show flow diagrams of methods of preventing interception of radiofrequency (RF) signals, in accordance with some embodiments of the inventive concepts disclosed herein.

DETAILED DESCRIPTION

Figure 1:
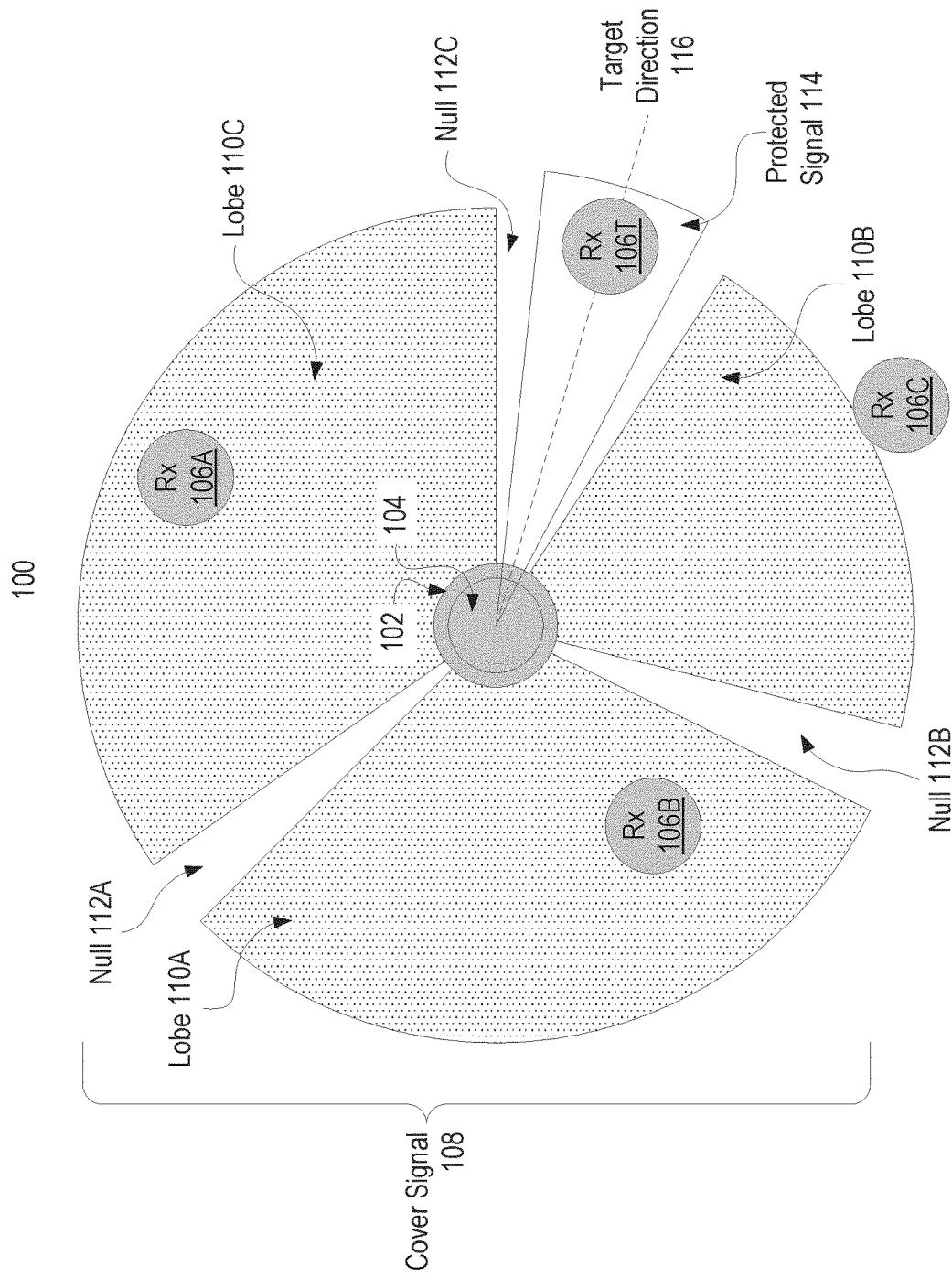
FIG. 1 is a block diagram of an environment for preventing interception of radiofrequency (RF) signals, in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

In some aspects, embodiments of the inventive concepts disclosed herein are directed to a system, a method, a device, or an apparatus for preventing interception of radiofrequency (RF) signals. Omnidirectional RF signals and, to a lesser extent, directional RF signals may be intercepted by entities besides the intended recipient. While transmitting directional RF signals may foil some interception techniques, advanced receiver configurations may make such signals still susceptible to interception. A well-determined adversary may position receiver devices and use advanced signal processing techniques to compromise low probability of intercept (LPI) radar techniques to extract the RF signal containing the information for the intended recipient. For instance, successive cancelation techniques may be used to identify the RF signal hidden among various other signals. Eigenanalysis techniques may be also used in conjunction with multiple receiver antennae to separate among different signals and noise to identify the RF signal. In addition, directional receiver antennae may reduce cover signals provided by other locations (e.g., base radio stations for television and radio broadcast) and deduce the hidden RF signal from the cover signal due to spatial separation.

To lower the likelihood that the RF signal is intercepted by such adversarial entities, a cover signal generator may generate a cover RF signal to hide a protected RF signal generated by a protected signal generator. The cover signal generator may transmit the cover RF signal with minima along the directions of the target recipients. In conjunction, the protected signal generator may transmit protected RF signals encoding data for the target recipients with maxima along the directions of the target recipients. The lobes of the cover RF signal may reduce the amount of area in which an adversary can intercept the protected RF signal, providing interference to such entities. Each minimum of the cover RF signal may serve as an opening through the protected RF signal can reach the target recipients. The widths of the minima may be narrower compared to the widths of the lobes to provide a smaller area where the protected RF signal is susceptible to interception. The amplitude of the cover RF signal at the minima may taper off to the maxima of the protected RF signal at the maxima to prevent exposure at natural nulls of the cover RF signal pattern.

In addition, the cover signal generator and the protected signal generator may coordinate with each other to synchronize various signal properties such as modulation, bandwidth, and timing to obfuscate the protected signal from advanced signal processing techniques. The cover signal and the protected signal may be transmitted using the same antenna or separate antennae to coordinate the generation and transmission of the RF signals. For example, the cover signal generator and the protected signal generator may generate RF signals with similar or same modulation, bandwidth, and timing to foil successive cancelation. The cover signal generator and the protected signal generator may also generate RF signals with different modulation, bandwidth, and timing to counteract against eigenanalysis techniques. Furthermore, the cover signal generator may dither the timing and frequency of the cover RF signal or vary the bandwidth and frequency of the cover RF signal to confuse the interceptor entity from tracking or analyzing the cover RF signal. The cover signal generator may also dither the directions of the minima of the cover RF signal to prevent detection in the natural nulls of the signal.

Referring now to FIG. 1, depicted is one embodiment of an environment 100 for preventing interception of radiofrequency (RF) signals. The environment 100 may include a cover signal generator device 102, a protected signal generator device 104, and one or more receiver devices 106A-N. The cover signal generator device 102, the protected signal generator device 104, and the one or more receiver devices 106A-N each may be any device capable of transmitting and/or receiving RF signals. The cover signal generator device 102, the protected signal generator device 104, and the one or more receiver devices 106A-N may reside in a radar tower, a computing device, a mobile device, a vehicle, an airplane, a watercraft, or a satellite, among others. In some embodiments, as shown in FIG. 1, the cover signal generator device 102 and the protected signal generator device 104 may be co-located. Among the one or more receiver devices 106A-N, a target receiver device 106T may be the intended recipient of data sent by the protected signal generator device 104. Some of the one or more receiver devices 106A-N may attempt to intercept the data communicated between the protected signal generator device 104 and the target receiver device 106T.

The cover signal generator device 102 and the protected signal generator device 104 may coordinate transmission of signals with each other to prevent reception of the data intended for the target receiver device 106T in accordance with an interception prevention configuration. To that end, the cover signal generator device 102 and the protected signal generator device 104 may each individually determine or identify a location of target receiver device 106T among the one or more receiver devices 106A-N. Using the location of the target receiver device 106T, the cover signal generator device 102 and the protected signal generator device 104 may each determine a target direction 116 toward the target receiver device 106T. The cover signal generator device 102 may generate and transmit a cover signal 108 using beamforming techniques based on the target direction 116 in accordance with the interception prevention configuration. The cover signal 108 may have one or more lobes 110A-N to define one or more nulls 112A-N. Each null 112A-N may correspond to a local minima in the cover signal 108 between the lobes 110A-N. A null can correspond to a region of the cover signal 108 that completely lacks signal strength. A null can correspond to a region of the cover signal 108 not completely lacking signal strength. For example, the nulls 112A-N may be −6 to −40 dB relative to the maximum signal strength (e.g., at the main lobe) of the cover signal 108. To provide space for the data to be conveyed from the protected signal generator device 104 to the target receiver device 106T, at least one of the nulls 112C may be generally along the target direction 116 toward the target receiver device 106T. The lobes 110A-C may cover receiver devices 106A-C other than the target receiver device 106T to provide interference (e.g., noise) to the receiver devices 106A-C.

In conjunction, the protected signal generator device 104 may generate and transmit a protected signal 114 using beamforming techniques based on the target direction 116 in accordance with the interception prevention configuration. The maximum of the protected signal 114 may be a directional signal generally along the target direction 116 toward the target receiver device 106T to provide the data to the target receiver device 106T. The maximum of the protected signal 114 may correspond to a main lobe, and may be 6 to 40 dB relative to the minimum of the protected signal 114. The cover signal generator device 102 and the protected signal generator device 104 may also coordinate various signal characteristics (e.g., modulation, bandwidth, and timing) of the cover signal 108 and the protected signal 114 to hamper attempts at intercepting and identifying the protected signal 114 by receiver devices 106A-N. It should be noted that the shapes of the radiation patterns of the cover signal 108 and the protected signal 114 as depicted in FIG. 1 are illustrative representations. The sharp quadrant corners of the radiative patterns as shown in the figure may not be present in physical examples of the cover signal 108 and the protected signal 114.

Figure 2:
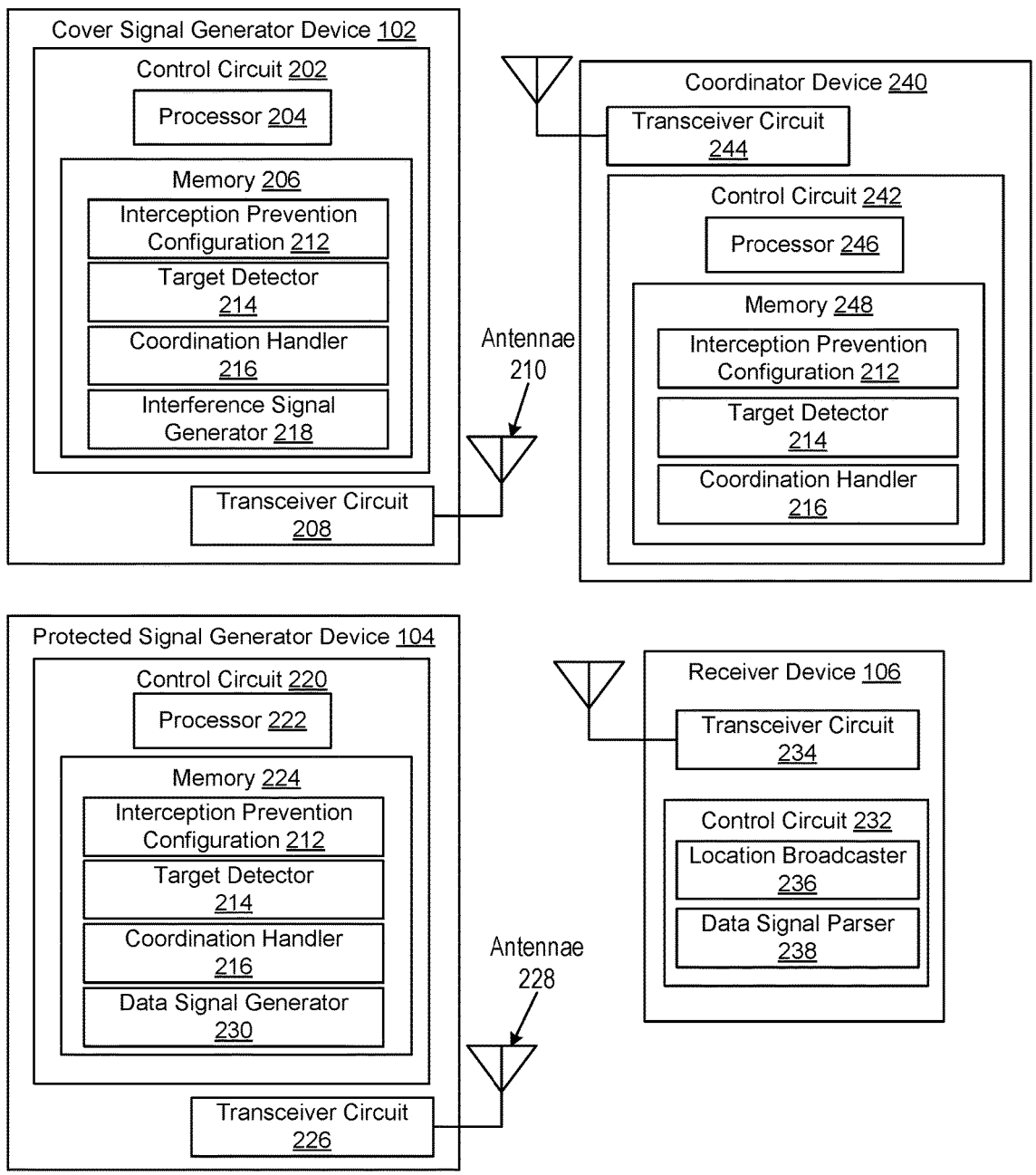
FIG. 2 shows a block diagram of a system architecture for preventing interception of RF signals, in accordance with some embodiments of the inventive concepts disclosed herein.

Referring now to FIG. 2, depicted is a block diagram of a system architecture 200 for preventing interception of RF signals. The system architecture 200 may include the cover signal generator device 102, the protected signal generator device 104, and the receiver device 106A-N (hereinafter generally referred to as receiver device 106). In some embodiments, the cover signal generator device 102 and the protected signal generator device 104 may be part of the same device (e.g., monolithically), and may share constituent components. In some embodiments, the cover signal generator device 102 and the protected signal generator device 104 may be separate devices. The cover signal generator device 102 may include a control circuit 202 with one or more processors 204 and memory 206 and a transceiver circuit 208 with a set of antennae 210. The memory 206 may include instructions to be executed by the processors 204, such as an interception prevention configuration 212, a target detector 214, a coordination handler 216, and an interference signal generator 218. The protected signal generator device 104 may include a control circuit 220 with one or more processors 222 and memory 224 and a transceiver circuit 226 with a set of antennae 228. The memory 224 may include instructions to be executed by the processors 222, such as an interception prevention configuration 212, the target detector 214, the coordination handler 216, and a data signal generator 230. The receiver device 106 may include a control circuit 232 and a transceiver circuit 234. The control circuit 232 may include a location broadcaster 236 and a data signal parser 238, among others.

In some embodiments, the system architecture 200 may include a coordinator device 240. The coordinator device 240 may include a control circuit 242 and a transceiver circuit 244 with a set of antennae. The control circuit 242 may include one or more processors 246 and memory 248. The memory 248 may include instructions to be executed by the processors 246, such as the interception prevention configuration 212, the target detector 214, and the coordination handler 216. In some embodiments, the coordinator device 240 may be part of the same device as the cover signal generator device 102 and/or the protected signal generator device 104. In some embodiments, the coordinator device 240 may be connected via wire to the cover signal generator device 102 and/or the protected signal generator device 104.

In the control circuits of each above mentioned device or component (e.g., the cover signal generator device 102, the protected signal generator device 104, the receiver device 106, and the device coordinator 240), the processors may include a microprocessor unit, an application-specific integrated circuit (ASIC), and a field-programmable gate array (FPGA), among others. The processors may also be a multi-core processor or an array of processors.

The memory of the control circuits in each above mentioned device or component may include electronic, optical, magnetic, or any other storage device capable of relaying or providing the processor with program instructions. The memory may include, for example, include a floppy disk, CD-ROM, DVD, magnetic disk, memory chip, Static random access memory (SRAM), Burst SRAM or SynchBurst SRAM (BSRAM), Dynamic random access memory (DRAM), Ferroelectric RAM (FRAM), NAND Flash, NOR Flash, and Solid State Drives (SSD), among others, or any combination thereof. The program instructions may include code from any programing language, such as C, C++, C#, Java, JavaScript, Perl, HTML, XML, Python, Visual Basic, et cetera, or any combination thereof.

The antennae of each above mentioned device or component may include a half-wave dipole, a dipole antenna (e.g., corner reflector or log-periodic), a monopole antenna (e.g., whip, mast, umbrella, or inverted F), a travelling wave antenna (e.g., helical or spiral), reflector antenna (e.g., corner or parabolic), an aperture antenna (e.g., parabolic, slot, horn, or dielectric), a microstrip antenna, an array antenna (e.g., phased array antenna, electronically scanned array (ESA) with a phase shifter, collinear array, planar array, and conformal array), or a loop antenna, among others, or any combination thereof.

The interception prevention configuration 212 maintained on each of the cover signal generator device 102, the protected signal generator device 104, and the coordinator device 240 may specify generation and transmission of the cover signal 108 and the protected signal 114 in relation to the target receiver device 106. The interception prevention configuration 212 may specify that the target receiver device 106 is to be located along a target direction 116 with respect to the cover signal generator device 102 and/or the protected signal generator device 104. In some embodiments, the cover signal generator device 102 and the protected signal generator device 104 may be co-located. As a result, the target direction 116 may be the same for the cover signal generator device 102 and the protected signal device 104. In some embodiments, the cover signal generator device 102, the protected signal generator device 104, and the target receiver device 106 may be co-aligned (e.g., located along the same line). The target direction 116 may be also the same for the cover signal generator device 102 and the protected signal device 104. In some embodiments, the cover signal generator device 102, the protected signal generator device 104, and the target receiver device 106 may be neither co-located nor co-aligned. For such instances, the target direction 116 may differ for the cover signal generator device 102 and the protected signal generator device 104 in relation to the target receiver device 106.

The interception prevention configuration 212 may specify that a signal strength of the cover signal 108 is to be greater than a detection threshold relative to a signal strength of the protected signal 114 along the target direction 116. The interception prevention configuration 212 may specify the detection threshold of the signal strength of the protected signal 114 relative to the signal strength of the cover signal 108 along the target direction 116. The detection threshold (sometimes referred to as a recovery threshold) may correspond to a relative signal strength at which the protected signal 114 may be recoverable from the cover signal 108 along the target direction 116. For example, the protected signal 114 may be 6 dB below the cover signal 108 along the target direction 116. With coding gain or modulation techniques (e.g., code-division multiple access (CDMA), direct-sequence spread spectrum (DSSS), and frequency hopping), the protected signal 114 may be recovered from the cover signal 108 when the signal strength of the protected signal 114 is within the detection threshold of the signal strength of the cover signal 108. In this manner, receipt of the data of the protected signal 114 transmitted from the protected signal generator device 104 may be limited to the target receiver device 106.

In some embodiments, the interception prevention configuration 212 may specify that the signal strength of the cover signal 108 is to be less than the signal strength of the protected signal 114 along the target direction 116 by the detection threshold. In some embodiments, the interception prevention configuration 212 may specify that the signal strength of the cover signal 108 from the cover signal generator device 102 along the target direction 116 is to correspond to one of the nulls 112A-N in the cover signal 108 (e.g., one of the minima in the cover signal 108, a back lobe or one of the side lobes with signal strength less than a main lobe in the cover signal 108), or a portion of the main lobe with a predefined signal strength less than the maximum (e.g., half-power beam width (HPBW)), among others. The main lobe of the cover signal 108 may correspond to the lobe with the greatest signal strength. The back lobe of the cover signal 108 may correspond to the side lobe in the opposite direction as the main lobe. The side lobe of the cover signal 108 may correspond to all other local maxima besides the main lobe.

The interception prevention configuration 212 may specify that the signal strength of the protected signal 114 from the protected signal generator device 104 along the target direction 116 is correspond to a main lobe of the protected signal 114 or one of a maxima in the protected signal 114 (e.g., side lobes or back lobe), among others. In some embodiments, the interception prevention configuration 212 may specify that the signal strength of the cover signal 108 is to be less than the detection threshold relative to the signal strength of the protected signal 114 in at least a target area. The target area may be located in the target direction 116, and may cover or include the target receiver device 106. In some embodiments, the interception prevention configuration 212 may specify that the signal strength of the cover signal 108 is to be greater than the signal strength of the protected signal 114 by the detection threshold outside the target area.

In some embodiments, the interception prevention configuration 212 may specify that the signal strength of the cover signal 108 from the cover signal generator device 102 in directions besides the target direction 116 is to be greater than the signal strength of the protected signal 114 by the detection threshold. For example, the interception prevention configuration 212 may specify that the signal strength of the protected signal 114 may be 6 dB below the signal strength of the cover signal 108 along the target direction 116 allowing recovery of the protected signal 114, but 20 dB below in all other directions besides the target direction 116 preventing recovery of the protected signal 114. In this manner, interference such as noise may be provided to receiver devices 106 besides the target receiver device 106 to prevent interception of the protected signal 114. The interception prevention configuration 212 may specify that the signal strength of the cover signal 108 from the cover signal generator device 102 outside the target direction 116 is to correspond to the maxima of the cover signal 108 (e.g., main lobe, back lobe, or side lobes). The interception prevention configuration 212 may specify that the signal strength of the protected signal 114 from the protected signal generator device 104 outside the target direction 116 is to correspond to one of the nulls 112A-N in the protected signal 114 (e.g., one of the minima in the protected signal 114), a minima, a back lobe or one of the side lobes with signal strength less than the main lobe in the protected signal 114, or a portion of the main lobe with a predefined signal strength less than the maximum (e.g., half-power beam width (HPBW)), among others. The main lobe of the protected signal 114 may correspond to the lobe with the greatest signal strength. The back lobe of the protected signal 114 may correspond to the side lobe in the opposite direction as the main lobe. The side lobes of the protected signal 114 may correspond to all other local maxima besides the main lobe.

In some embodiments, the interception prevention configuration 212 may specify an order of the cover signal 108 and an order of the protected signal 114 (e.g., number of nulls and lobes). The interception prevention configuration 212 may specify a directionality of the cover signal 108 and a directionality of the protected signal 114 (e.g., omnidirectional or bidirectional). For example, the interception prevention configuration 212 may be of the form:

| Combination index | Cover | Protected |
| --- | --- | --- |
| 1 | Omnidirectional | Omnidirectional |
| 2 | Omnidirectional | Directional |
| 3 | Null placement | Omnidirectional |
| 4 | Null placement | Directional |

The interception prevention configuration 212 may specify coordination of the signal properties of the cover signal 108 and the protected signal 114 between the cover signal generator device 102 and the protected signal generator device 104. The signal properties of the cover signal 108 and the protected signal 114 may include a modulation (e.g., amplitude modulation (AM), phase modulation (PM), frequency modulation (FM), quadrature modulation (QAM), double-sideband modulation (DSM), and single-sideband modulation (SSM)), bandwidth (e.g., signal spectrum with a carrier frequency), timing (e.g., a transmission time window), and polarization, among other others.

In some embodiments, the interception prevention configuration 212 may specify that the cover signal 108 and the protected signal 114 be dithered. The dithering may be in accordance to a predefined schedule. The predefined schedule may specify signal strengths of the cover signal 108 and the protected signal 114 for a set of predefined time periods. The predefined time periods may be randomly distributed. In some embodiments, the interception prevention configuration 212 may specify that the signal strength of the protected signal 114 is to be greater than the detection threshold relative to the signal strength of the cover signal 108 along the target direction 116 for a predefined time period. The interception prevention configuration 212 may specify that the signal strength of the protected signal 114 is to be less than the detection threshold relative to the signal strength of the cover signal 108 along the target direction 116 for another predefined time period. In some embodiments, the interception prevention configuration 212 may specify that the signal strength of the protected signal 114 is to be greater than the detection threshold relative to the signal strength of the cover signal 108 along a pre-specified direction besides the target direction 116 for a predefined time period. The interception prevention configuration 212 may specify that the signal strength of the protected signal 114 is to be less than the detection threshold relative to the signal strength of the cover signal 108 along a pre-specified direction besides the target direction 116 for another predefined time period.

Coordinating the signal properties of the cover signal 108 and the protected signal 114 may make it difficult for receiver devices 106 besides the target receiver device 106 to separate and identify the protected signal 114 from the cover signal 108. In some embodiments, the interception prevention configuration 212 may specify that the signal properties of the cover signal 108 be the same as the signal properties of the protected signal 114. For example, the modulation, timing, and the bandwidths of the cover signal 108 and the protected signal 114 may be the same to foil signal separation by receiver devices 106 attempting to intercept and extract the protected signal 114 from the cover signal 108. In some embodiments, the interception prevention configuration 212 may specify that the signal properties of the cover signal 108 differ from the signal properties of the protected signal 114. For example, the timing and the bandwidths of the cover signal 108 and the protected signal 114 may differ to make it difficult for receiver devices 106 attempting to track the cover signal 108 to extract the protected signal 114.

In some embodiments, the interception prevention configuration 212 may specify use of multiple cover signals 108 and/or multiple protected signals 114. The interception prevention configuration 212 may specify that signal strength of each cover signal 108 may be less than the detection threshold relative to the signal strength of one or more of the protected signals 114 along the target direction 118 or the target area. In some embodiments, the interception prevention configuration 212 may specify signal properties (e.g., modulation, bandwidth, timing, and polarization) for each cover signal 108. Each cover signal 108 may be generated by a corresponding cover signal generator device 102. The interception prevention configuration 212 may specify that the signal properties of one cover signal 108 may differ at least partially from the properties of another cover signal 108. For example, one cover signal 108 may span a bandwidth different from another cover signal 108. In some embodiments, the interception prevention configuration 212 may specify signal properties (e.g., modulation, bandwidth, timing, and polarization) for each protected signal 114. Each protected signal 114 may be generated by a corresponding protected signal generator device 104. In some embodiments, the signal properties of one protected signal 114 may differ at least partially from the properties of another protected signal 114. In some embodiments, the interception prevention configuration 212 may specify that the multiple protected signals 114 have the same phase along the target direction 118 or the target area.

The target detector 214 executing on each of the cover signal generator device 102, the protected signal generator device 104, and the coordinator device 240 may detect, identify, or otherwise determine the target direction 116 along which the target receiver device 106 is located. In some embodiments, the target detector 214 may use sensing techniques to determine: the target direction 116 along which the target receiver device 106 is located; a distance of the target receiver device 106 relative to the cover signal generator device 102 or the protected signal generator device 104; or a velocity of the target receiver device 106 relative to the cover signal generator device 102 or the protected signal generator device 104, among others. The sensing techniques may include radar (e.g., monostatic or multistatic), monopulse array processing, and multi-antennae algorithms (e.g., estimation of signal parameters via rotational invariance techniques (ESPRIT) and multiple signal classification (MUSIC)), among others. For example, the target detector 214 of the cover signal generator device 102 or the protected signal generator device 104 may send an omnidirectional pulsed or a continuous radio wave via the antennae 210 or 228. The target detector 214 may wait to receive a reflected radio wave from the target receiver device 106. Using the reflected radio wave and time between the transmission of the initial radio wave and the reflected radio wave, the target detector 214 may determine the target direction 116 and the relative distance and velocity of the target receiver device 106. In some embodiments, the target detector 214 may also detect, identify, or otherwise determine other directions along which the receiver devices 106 besides the target receiver device 106 are located. In some embodiments, the target detector 214 may use radar to determine: the direction along which the receiver device 106 is located; a distance of the receiver device 106 relative to the cover signal generator device 102 or the protected signal generator device 104; or a velocity of the receiver device 106 relative to the cover signal generator device 102 or the protected signal generator device 104, among others.

The target detector 214 may identify or otherwise determine the target direction 116 along which the target receiver device 106 is located based on a location of the target receiver device 106. In some embodiments, the target detector 214 may identify a location identifier (e.g., latitude and longitude coordinates) of the receiver device 106. In some embodiments, the location broadcaster 236 executing on each of the receiver device 106 may access a global position system (GPS) on the receiver device 106 to identify the location identifier for the receiver device 106. The location broadcaster 236 may broadcast or otherwise transmit the location identifier via the antennae of the transceiver circuit 234. In some embodiments, the location broadcaster 236 may include a request with the location identifier. The request may serve to indicate that the receiver device 106 is configured to receive data in accordance with the interception prevention configuration 212. The target detector 214 may receive the location identifier of the receiver device 106 transmitted from the receiver device 106. In some embodiments, the target detector 214 may determine that the location identifier is received with the request. When the request indicates that the receiver device 106 is configured to receive data in accordance with the interception prevention configuration 212, the target detector 214 may determine that the source receiver device 106 is the target receiver device 106. Conversely, when the location identifier is not received in conjunction with the location identifier, the target detector 214 may determine that the source receiver device 106 is not a target receiver device 106. In some embodiments, the target detector 214 may identify the location identifier of the target receiver device 106 provided via an ad hoc network.

The target detector 214 may identify a location identifier of the cover signal generator device 102 or the protected signal generator device 104. In some embodiments, the target detector 214 may access a global position system (GPS) on the cover signal generator device 102, the protected signal generator device 104, and/or the coordinator device 240 to identify the location identifier of the cover signal generator device 102 or the protected signal generator device 104. In some embodiments, the target detector 214 executing on the coordinator device 240 may transmit or provide the location identifier of the target receiver device 106 to the cover signal generator device 102 and the protected signal generator device 104. Using the location identifier of the receiver device 106 and the location identifier of the cover signal generator device 102 or the protected signal generator device 104, the target detector 214 may determine the target direction 116 relative to the cover signal generator device 102 or the protected signal generator device 104. In some embodiments, the determination of the target direction 116 may be performed by the target detector 214, when the source receiver device 106 is determined to be the target receiver device 106. In some embodiments, the target detector 214 may identify or receive the location identifier of the cover signal generator device 102 or the protected signal generator device 104 provided via an ad hoc network (e.g., wireless ad hoc network (WANET), mobile ad hoc network (MANET), and near-field communication (NFC)).

In some embodiments, the target detector 214 executing on the coordinator device 240 may identify the location identifier of the target receiver device 106 (e.g., using the above detailed functionalities). The target detector 214 of the coordinator device 240 may also identify the location identifier of the cover signal generator device 102 and the location identifier of the protected signal generator device 104 (e.g., using radar or GPS). Using the location identifiers of the target receiver device 106 and the cover signal generator device 102, the target detector 214 of the coordinator device 240 may determine the target direction 116 between the cover signal generator device 102 and the target receiver device 106. The target detector 214 of the coordinator device 240 may transmit or provide the target direction 116 to the cover signal generator device 102 via the transceiver circuit 244. Using the location identifiers of the target receiver device 106 and the protected signal generator device 104, the target detector 214 of the coordinator device 240 may determine the target direction 116 between the protected signal generator device 104 and the target receiver device 106. The target detector 214 of the coordinator device 240 may transmit or provide the target direction 116 to the protected signal generator device 104 via the transceiver circuit 244.

In some embodiments, the target detector 214 may determine a change in direction of the target receiver device 106 from the initial target direction 116. The cover signal generator device 102, the protected signal generator device 104, and the target receiver device 106 may move or change in position relative to one another. In some embodiments, the target detector 214 may determine the change in direction of the target receiver device 106 based on the relative velocity of the cover signal generator device 102, the protected signal generator device 104, and/or the target receiver device 106 determined using radar. In some embodiments, the target detector 214 may determine the change in direction of the target receiver device 106 using the location identifiers of at least one of the cover signal generator device 102, the protected signal generator device 104, and/or the target receiver device 106. The target detector 214 may calculate or determine the change in relative position by comparing the current location identifiers with prior location identifiers. Based on the change in relative positions of the cover signal generator device 102, the protected signal generator device 104, and/or the target receiver device 106, the target detector 214 may determine the change in the direction of the target receiver device 106 relative to the initial target direction 116.

In some embodiments, the target detector 214 may detect, identify, or otherwise determine multiple target directions 116. For example, there may be multiple target receiver devices 106 to communicate with the protected signal generator device 104. The target detector 214 may detect an additional target receiver device 106 using similar techniques as detailed above. The detection of the additional target receiver device 106 may be subsequent to transmission of the cover signal 108 and/or the protected signal 114. In some embodiments, the target detector 214 may use sensing techniques to determine: the direction along which the additional receiver device 106 is located; a distance of the additional receiver device 106 relative to the cover signal generator device 102 or the protected signal generator device 104; or a velocity of the additional receiver device 106 relative to the cover signal generator device 102 or the protected signal generator device 104, among others. In some embodiments, the target detector 214 may determine the additional receiver device 106 based on receipt of the location identifier with the request indicating that the additional receiver device 106 is to receive data in accordance with the interception prevention configuration 212. Based on the determination of the additional receiver device 106, the target detector 214 may determine the new target direction 116 for the addition receiver device 106 relative to the cover signal generator device 102 and the protected signal generator device 104.

In some embodiments, the target detector 214 may detect, identify, or otherwise determine one or more avoidance directions at which an interceptor receiver device 106 is located. For example, there may be multiple interceptor receiver devices 106 to attempting to eavesdrop and intercept on the data in the protected signal 114. The target detector 214 may detect an interceptor receiver device 106 using similar techniques as detailed above. The detection of the interceptor receiver device 106 may be subsequent to transmission of the cover signal 108 and/or the protected signal 114. In some embodiments, the target detector 214 may use sensing techniques to determine: the direction along which the additional receiver device 106 is located; a distance of the interceptor receiver device 106 relative to the cover signal generator device 102 or the protected signal generator device 104; or a velocity of the interceptor receiver device 106 relative to the cover signal generator device 102 or the protected signal generator device 104, among others. Based on the determination of the interceptor receiver device 106, the target detector 214 may determine the avoidance direction for the interceptor receiver device 106 relative to the cover signal generator device 102 and the protected signal generator device 104. The target detector 214 may also determine an avoidance area based on the avoidance direction at which the interceptor receiver device 106 is located.

In some embodiments, the target detector 214 may determine the target area in which the target receiver device 106 is located. As discussed above, the target direction 116 along which the target receiver device 106 is located may differ relative to the cover signal generator device 102 and the protected signal generator device 104. The target detector 214 executing on the cover signal generator device 102 may transmit or provide the location identifier of the cover signal generator device 102 via the antennae 210 to the target detector 214 executing on the protected signal generator device 104. Conversely, the target detector 214 executing on the protected signal generator device 104 may transmit or provide the location identifier of the protected signal generator device 104 via the antennae 228 to the target detector 214 executing on the cover signal generator device 102. In some embodiments, the target detector 214 of the coordinator device 240 may transmit or provide the location identifier of the cover signal generator device 102 to the protected signal generator device 104 and the location identifier of the protected signal generator device 104 to the cover signal generator device 102. The target detectors 214 executing on the cover signal generator device 102 and the protected signal generator device 104 may each separately identify the location identifier of the target receiver device 106. Based on the location identifiers of the cover signal generator device 102, the protected signal generator device 104, and the target receiver device 106, each target detector 214 may determine the target area in which the target receiver device 106 is located.

The coordination handlers 216 executing on the cover signal generator device 102, the protected signal generator device 104, and the coordinator device 240 may exchange information with one another. The exchanged information may include the location identifiers of the cover signal generator device 102, the protected signal generator device 104, the coordinator device 240, and the target receiver device 106. The exchanged information may include the target direction 116 between the target receiver device 106 and the cover signal generator device 102 and between the target receiver device 106 and the protected signal generator device 104. The exchanged information may also include signal properties of the cover signal 108 and the protected signal 114. In some embodiments, the information may be exchanged between the cover signal generator device 102 and the protected signal generator device 104 via the coordinator device 240.

The coordination handler 216 may also synchronize or coordinate transmission and generation of the cover signal 108 and the protected signal 114 in accordance with the interception prevention configuration 112. The coordination handlers 214 may set a time for initiating generation and transmissions of the cover signal 108 and the protected signal 114. In some embodiments, the coordination handler 216 executing on the cover signal generator device 102 may initiate transmission of the cover signal 108, responsive to the transmission of the protected signal 114 by the protected signal generator device 104. In some embodiments, the coordination handler 216 executing on the protected signal generator device 104 may initiate transmission of the protected signal 114, responsive to the transmission of the cover signal 108 by the cover signal generator device 102. The coordination handler 216 may modify the generation of the cover signal 108 based on the protected signal 114, and vice-versa. The details of the modification are explained herein below.

The interference signal generator 218 executing on the cover signal generator device 102 may generate the cover signal 108 using the target direction 116 in accordance with the interception prevention configuration 212. The interference signal generator 218 may provide interference via the cover signal 108 to the receiver devices 106 besides the target receiver device 106 to prevent the receiver devices 106 from intercepting the data included in the protected signal 114. In some embodiments, the interference signal generator 218 may use a pseudo-random number generator to create noise for the cover signal 108. As discussed above, the interception prevention configuration 212 may specify that the cover signal 108 is to have a signal strength less than a signal strength of the protected signal 114 along the target direction 116 or within the target area containing the target receiver device 106. In accordance with the specifications of the interception prevention configuration 212, the interference signal generator 218 may set the signal strength of the cover signal 108 to be less than the signal strength of the protected signal 114 generally along the target direction 116 (e.g., within 0 to 10%, or some other range). The interference signal generator 218 may set the signal strength of the cover signal 108 along the target direction 116 to be less than the signal strengths of the cover signal 108 adjacent to the target direction 116. In some embodiments, the interference signal generator 218 may set the one or more lobes (e.g., main lobe or back lobe) of the cover signal 108 away from the target direction 116 or the target area. In some embodiments, the interference signal generator 218 may set the one or more lobes of the cover signal 108 to cover receiver devices 106 besides the target receiver device 106. In some embodiments, the interference signal generator 218 may set at least one of the nulls 112A-N (e.g., one of the minima), minima, side lobes, or a portion of the main lobe with the predefined signal strength less than the maxima of the cover signal 108 toward the target direction 116 or the target area. The functionalities of the interference signal generator 218 may be repeated over multiple target directions 116 and multiple target receiver devices 106.

In some embodiments, in response to detecting the interceptor receiver device 106, the interference signal generator 218 may modify the cover signal 108 in accordance with the interference protection configuration 212. The interference signal generator 218 may modify the cover signal 108 based on the avoidance direction of the interceptor receiver device 106. In some embodiments, the interference signal generator 218 may set the signal strength of the cover signal 108 to be greater than the detection threshold relative to the signal strength of the protected signal 114 along the avoidance direction of the interceptor receiver device 106. The interference signal generator 218 may set the signal strength of the cover signal 108 along the avoidance direction to be less than the signal strengths of the cover signal 108 adjacent to the avoidance direction of the interceptor receiver device 106. In some embodiments, the interference signal generator 218 may set the one or more lobes of the cover signal 108 toward the avoidance direction or the avoidance area of the interceptor receiver device 106. In some embodiments, the interference signal generator 218 may set the one or more lobes of the cover signal 108 to cover the interceptor receiver device 106. In some embodiments, the interference signal generator 218 may set at least one of the nulls 112A-N (e.g., one of the minima), minima, side lobes, or a portion of the main lobe with the predefined signal strength less than the maxima of the cover signal 108 away from the avoidance direction or the avoidance area of the interceptor receiver device 106.

In some embodiments, the interference signal generator 218 may cause the transceiver circuit 208 to change the orientation of the set of antennae 210 based on the avoidance direction. In orienting the set of antennae 210, the interference signal generator 218 may transmit the cover signal 108 to set the signal strength of the cover signal 108 to be greater than the detection threshold relative to the signal strength of the protected signal 114 along the avoidance direction. In some embodiments, the interference signal generator 218 may orient the set of antennae 210 to set the one or more lobes of the cover signal 108 toward the avoidance direction of the interceptor receiver device 106. In some embodiments, the interference signal generator 218 may orient the set of antennae 210 to set at least one of the nulls 112A-N (e.g., one of the minima), minima, side lobes, or a portion of the main lobe with the predefined signal strength less than the maxima of the cover signal 108 away from the avoidance direction or the avoidance area. The interference signal generator 218 may transmit the cover signal 108 via the set of antennae 210 of the transceiver circuit 208 in accordance with the interference protection configuration 212. In some embodiments, the set of antennae 210 of the transceiver circuit 208 may be an omnidirectional antenna, such as biconical antenna, a dipole antenna, or a loop antenna, among others. In some embodiments, the set of antennae 210 of the transceiver circuit 208 may be a directional antennae, such as a parabolic antennae, a phased array antennae, or a helical antennae, among others. The cover signal 108 transmitted via the set of antennae 210 may be a directional signal with one or more lobes 110A-N and one or more nulls 112A-N. In some embodiments, the interference signal generator 218 may cause the transceiver circuit 208 to change an orientation of the set of antennae 210 based on the target direction 116. In orienting the set of antennae 210, the interference signal generator 218 may transmit the cover signal 108 to set the signal strength of the cover signal 108 to be less than the signal strength of the protected signal 114 along the target direction 114. In some embodiments, the interference signal generator 218 may orient the set of antennae 210 to set the one or more lobes (e.g., main lobe or back lobe) of the cover signal 108 away from the target direction 116 or the target area. In some embodiments, the interference signal generator 218 may orient the set of antennae 210 to set at least one of the nulls 112A-N (e.g., one of the minima), minima, side lobes, or a portion of the main lobe with the predefined signal strength less than the maxima of the cover signal 108 toward the target direction 116 or the target area. In this manner, the target receiver device 106 may remain unaffected by the cover signal 108, while other receiver devices 106 may receive the noise of the cover signal 108 thereby preventing interception of the data.

In some embodiments, the interference signal generator 218 may modify the cover signal 108 by dithering in accordance to the interception prevention configuration 212. As discussed above, the interception prevention configuration 212 may specify changes to signal strength the cover signal 108 based on the predefined schedule. In some embodiments, the interference signal generator 218 may maintain a timer to identify a current time. The interference signal generator 218 may compare the current time to the predefined schedule. Based on the comparison, the interference signal generator 218 may set the signal strength of the cover signal 108 to be less than the detection threshold relative to the signal strength of the protected signal 114 along the target direction 116. The interference signal generator 218 may set the signal strength of the cover signal 108 to be greater than the detection threshold relative to the signal strength of the protected signal 114 in a pre-specified direction besides the target direction 116. Based on the comparison, the interference signal generator 218 may set the signal strength of the cover signal 108 to be greater than the detection threshold relative to the signal strength of the protected signal 114 along the target direction 116. The interference signal generator 218 may set the signal strength of the cover signal 108 to be less than the detection threshold relative to the signal strength of the protected signal 114 in a pre-specified direction besides the target direction 116. The interference signal generator 218 may repeat these functionalities, as specified by the predefined schedule of the interception prevention configuration 212.

The interference signal generator 218 may cause the transceiver circuit 208 to change the orientation of the set of antennae 210 to dither the cover signal 108. In orienting the set of antennae 210, the interference signal generator 218 may set the signal strength of the cover signal 108 to be less than the detection threshold relative to the signal strength of the protected signal 114 along the target direction 116 for the pre-specified period of time. The interference signal generator 218 may further orient the set of antennae 210 to set the signal strength of the cover signal 108 to be greater than the detection threshold relative to the signal strength of the protected signal 114 in a pre-specified direction besides the target direction 116 the pre-specified period of time. In some embodiments, the interference signal generator 218 may orient the set of antennae 210 to set the one or more lobes (e.g., main lobe or back lobe) of the cover signal 108 toward the target direction 116 for the pre-specified period of time. In some embodiments, the interference signal generator 218 may orient the set of antennae 210 to set at least one of the nulls 112A-N (e.g., one of the minima), minima, side lobes, or a portion of the main lobe with the predefined signal strength less than the maxima of the cover signal 108 toward the pre-specified direction. Furthermore, the interference signal generator 218 may orient the set of antennae 210 to set the signal strength of the cover signal 108 to be greater than the detection threshold relative to the signal strength of the protected signal 114 along the target direction 116 for the pre-specified period of time. The interference signal generator 218 may further orient the set of antennae 210 to set the signal strength of the cover signal 108 to be less than the detection threshold relative to the signal strength of the protected signal 114 in a pre-specified direction besides the target direction 116 the pre-specified period of time. In some embodiments, the interference signal generator 218 may orient the set of antennae 210 to set the one or more lobes (e.g., main lobe or back lobe) of the cover signal 108 away from the target direction 116 for the pre-specified period of time. In some embodiments, the interference signal generator 218 may orient the set of antennae 210 to set at least one of the nulls 112A-N, minima, side lobes, or a portion of the main lobe with the predefined signal strength less than the maxima of the cover signal 108 away from the pre-specified direction.

Based on the determined change in direction of the target receiver device 106 relative to the cover signal generator device 102, the interference signal generator 218 may modify the cover signal 108 in accordance with the interference protection configuration 212. Using the new target direction 116 or the new target area, the interference signal generator 218 may modify the cover signal 108 in accordance with the interception prevention configuration 212. In some embodiments, the interference signal generator 218 may set the signal strength of the cover signal 108 to be less than the signal strength of the protected signal 114 along the new target direction 116. The interference signal generator 218 may also set the signal strength of the cover signal 108 to be greater than the signal strength of the protected signal 114 along the previous target direction 116 by the detection threshold. In some embodiments, the interference signal generator 218 may set the one or more lobes of the cover signal 108 away from the new target direction 116 different from the previous target direction 116 or the new target area different from the previous target area. In some embodiments, the interference signal generator 218 may set at least one of the nulls 112A-N, minima, side lobes, or a portion of the main lobe with the predefined signal strength less than the maxima of the cover signal 108 toward the new target direction 116 different from the previous target direction 116 or the new target area different the previous target area.

In some embodiments, the interference signal generator 218 may cause the transceiver circuit 208 to change the orientation of the set of antennae 210 based on the new target direction 116. In orienting the set of antennae 210, the interference signal generator 218 may transmit the cover signal 108 to set the signal strength of the cover signal 108 to be less than the signal strength of the protected signal 114 along the new target direction 116. In some embodiments, the interference signal generator 218 may orient the set of antennae 210 to set the one or more lobes of the cover signal 108 away from the new target direction 116 or the new target area. In some embodiments, the interference signal generator 218 may orient the set of antennae 210 to set at least one of the nulls 112A-N, minima, side lobes, or a portion of the main lobe with the predefined signal strength less than the maxima of the cover signal 108 toward the new target direction 116 or the new target area.

In response to detecting the additional target receiver device 106, the interference signal generator 218 may modify the cover signal 108 in accordance with the interference protection configuration 212. The interference signal generator 218 may modify the cover signal 108 based on the target direction 116 of the additional target receiver device 106. In some embodiments, the interference signal generator 218 may set the signal strength of the cover signal 108 to be less than the detection threshold relative to the signal strength of the protected signal 114 along the target direction 116 of the additional target receiver device 106. The interference signal generator 218 may set the signal strength of the cover signal 108 along the target direction 116 to be less than the signal strengths of the cover signal 108 adjacent to the target direction 116 of the additional target receiver device 106. In some embodiments, the interference signal generator 218 may set the one or more lobes of the cover signal 108 away from the target direction 116 or the target area of the additional target receiver device 106. In some embodiments, the interference signal generator 218 may set the one or more lobes of the cover signal 108 to cover receiver devices 106 besides the target receiver device 106 and the additional target receiver device 106. In some embodiments, the interference signal generator 218 may set at least one of the nulls 112A-N, minima, side lobes, or a portion of the main lobe with the predefined signal strength less than the maxima of the cover signal 108 toward the target direction 116 or the target area of the additional target receiver device 106.

In some embodiments, the interference signal generator 218 may cause the transceiver circuit 208 to change the orientation of the set of antennae 210 based on the new target direction 116. In orienting the set of antennae 210, the interference signal generator 218 may transmit the cover signal 108 to set the signal strength of the cover signal 108 to be less than the detection threshold relative to the signal strength of the protected signal 114 along the target directions 116 of the target receiver device 106 and the additional target receiver device 106. In some embodiments, the interference signal generator 218 may orient the set of antennae 210 to set the one or more lobes of the cover signal 108 away from the target directions 116 or the target areas of the target receiver device 106 and the additional target receiver device 106. In some embodiments, the interference signal generator 218 may orient the set of antennae 210 to set at least one of the nulls 112A-N, minima, side lobes, or a portion of the main lobe with the predefined signal strength less than the maxima of the cover signal 108 toward the target directions 116 or the target areas of the target receiver device 106 and the additional target receiver device 106.

The data signal generator 230 executing on the protected signal generator device 104 may generate the protected signal 114 using the target direction 116 in accordance with the interception prevention configuration 212. The data signal generator 230 may provide the data included in the protected signal 114 to the target receiver device 106, while preventing other receiver devices 106 besides the target receiver device 106. The protected signal 114 may contain, embed, or otherwise include the data to be parsed by the target receiver device 106. As discussed above, the interception prevention configuration 212 may specify that the signal strength of the protected signal 114 is to be greater than the detection threshold relative to the signal strength of the cover signal 108 along the target direction 116. In accordance with the specifications of the interception prevention configuration 212, the data signal generator 230 may set the signal strength of the protected signal 114 to be greater than the detection threshold relative to the signal strength of the cover signal 108 generally along the target direction 116 (e.g., within 0 to 10%). The data signal generator 230 may set the signal strength of the cover signal 108 along the target direction 116 to be greater than the signal strengths of the cover signal 108 adjacent to the target direction 116. The data signal generator 230 may set the signal strength of the protected signal 114 along the target direction 116 to be greater than the signal strengths of the protected signal 114 adjacent to the target direction 116. In some embodiments, the data signal generator 230 may set the one or more lobes (e.g., main lobe or back lobe) of the protected signal 114 along the target direction 116 or the target area. In some embodiments, the data signal generator 230 may set the one or more lobes of the protected signal 114 to cover receiver devices 106 besides the target receiver device 106. In some embodiments, the data signal generator 230 may set all of the nulls, minima, or side lobes away the target direction 116 or the target area. The functionalities of the data signal generator 230 may be repeated over multiple target directions 116 and multiple target receiver devices 106. In some embodiments, in response to detecting the interceptor receiver device 106, the data signal generator 230 may modify the protected signal 114 in accordance with the interference protection configuration 212. The data signal generator 230 may modify the protected signal 114 based on the avoidance direction of the interceptor receiver device 106. In some embodiments, the data signal generator 230 may termination transmission of the protected signal 114. The data signal generator 230 may set the signal strength of the protected signal 114 to be less than the detection threshold relative to the signal strength of the cover signal 108 along the avoidance direction of the interceptor receiver device 106. In some embodiments, the data signal generator 230 may set the one or more lobes of the protected signal 114 away from the avoidance direction or the avoidance area of the interceptor receiver device 106. In some embodiments, the data signal generator 230 may set at least one of the nulls 112A-N, minima, side lobes, or a portion of the main lobe with the predefined signal strength less than the maxima of the protected signal 114 away from the avoidance direction or the avoidance area of the interceptor receiver device 106.

In some embodiments, the data signal generator 230 may cause the transceiver circuit 208 to change the orientation of the set of antennae 210 based on the avoidance direction. In orienting the set of antennae 210, the data signal generator 230 may transmit the protected signal 114 to set the signal strength of the protected signal 114 to be less than the detection threshold relative to the signal strength of the cover signal 108 along the avoidance direction. In some embodiments, the data signal generator 230 may orient the set of antennae 210 to set the one or more lobes of the protected signal 114 away from the avoidance direction of the interceptor receiver device 106. In some embodiments, the data signal generator 230 may orient the set of antennae 210 to set at least one of the nulls 112A-N, minima, side lobes, or a portion of the main lobe with the predefined signal strength less than the maxima of the protected signal 114 toward the avoidance direction or the avoidance area.

The data signal generator 230 may transmit the protected signal 114 via the set of antennae 228 of the transceiver circuit 226 in accordance with the interference protection configuration 212. The data signal generator 230 may encode the data into the protected signal 114. For example, the data signal generator 230 may use a modulator to encode the data into the protected signal 114. The modulator may apply various modulation techniques, such as coding in code-division multiple access (CDMA), spreading in direct-sequence spread spectrum (DSSS), and spreading in frequency hopping, among others, or any combination thereof. In some embodiments, the data signal generator 230 may apply coding gain technique to the data in generating the protected signal 114. In some embodiments, the set of antennae 228 of the transceiver circuit 226 may be an omnidirectional antenna, such as biconical antenna, a dipole antenna, or a loop antenna, among others. In some embodiments, the set of antennae 228 of the transceiver circuit 226 may be a directional antennae, such as a parabolic antennae, a phased array antennae, or a helical antennae, among others. The protected signal 114 transmitted via the set of antennae 228 may be a directional signal with one or more lobes and one or more nulls. In some embodiments, the data signal generator 230 may cause the transceiver circuit 226 to change an orientation of the set of antennae 228 based on the target direction 116. In orienting the set of antennae 228, the data signal generator 230 may transmit the cover signal 108 to set the signal strength of the protected signal 114 to be greater than the detection threshold relative to the signal strength of the cover signal 108 along the target direction 114. In some embodiments, the data signal generator 230 may orient the set of antennae 228 to set the one or more lobes (e.g., main lobe or back lobe) of the protected signal 114 toward the target direction 116 or the target area. In some embodiments, the data signal generator 230 may orient the set of antennae 228 to set at least one of the nulls, minima, or side lobes away from the target direction 116 or the target area. In this manner, the target receiver device 106 may receive the protected signal 114, while other receiver devices 106 may receive the noise of the cover signal 108 thereby preventing interception of the data included in the protected signal 114.

In some embodiments, the data signal generator 230 may modify the protected signal 114 by dithering in accordance to the interception prevention configuration 212. As discussed above, the interception prevention configuration 212 may specify changes to signal strength the protected signal 114 based on the predefined schedule. In some embodiments, the data signal generator 230 may maintain a timer to identify a current time. The data signal generator 230 may compare the current time to the predefined schedule. Based on the comparison, the data signal generator 230 may set the signal strength of the protected signal 114 to be less than the detection threshold relative to the signal strength of the cover signal 108 along the target direction 116. The data signal generator 230 may set the signal strength of the protected signal 114 to be greater than the detection threshold relative to the signal strength of the cover signal 108 in a pre-specified direction besides the target direction 116. Based on the comparison, the data signal generator 230 may set the signal strength of the protected signal 114 to be greater than the detection threshold relative to the signal strength of the cover signal 108 along the target direction 116. The data signal generator 230 may set the signal strength of the protected signal 114 to be less than the detection threshold relative to the signal strength of the cover signal 108 in a pre-specified direction besides the target direction 116. The data signal generator 230 may repeat these functionalities, as specified by the predefined schedule of the interception prevention configuration 212.

The data signal generator 230 may cause the transceiver circuit 208 to change the orientation of the set of antennae 228 to dither the protected signal 114. In orienting the set of antennae 228, the data signal generator 230 may set the signal strength of the protected signal 114 to be less than the detection threshold relative to the signal strength of the cover signal 108 along the target direction 116 for the pre-specified period of time. The data signal generator 230 may further orient the set of antennae 228 to set the signal strength of the protected signal 114 to be greater than the detection threshold relative to the signal strength of the cover signal 108 in a pre-specified direction besides the target direction 116 the pre-specified period of time. In some embodiments, the data signal generator 230 may orient the set of antennae 228 to set the one or more lobes (e.g., main lobe or back lobe) of the protected signal 114 away from the target direction 116 and to the pre-specified direction for the pre-specified period of time. In some embodiments, the data signal generator 230 may orient the set of antennae 228 to set at least one of the nulls 112A-N, minima, side lobes, or a portion of the main lobe with the predefined signal strength less than the maxima of the protected signal 114 toward the target direction 116. Furthermore, the data signal generator 230 may orient the set of antennae 228 to set the signal strength of the protected signal 114 to be greater than the detection threshold relative to the signal strength of the cover signal 108 along the target direction 116 for the pre-specified period of time. The data signal generator 230 may further orient the set of antennae 228 to set the signal strength of the protected signal 114 to be less than the detection threshold relative to the signal strength of the cover signal 108 in a pre-specified direction besides the target direction 116 the pre-specified period of time. In some embodiments, the data signal generator 230 may orient the set of antennae 228 to set the one or more lobes (e.g., main lobe or back lobe) of the protected signal 114 to the target direction for the pre-specified period of time. In some embodiments, the data signal generator 230 may orient the set of antennae 228 to set at least one of the nulls 112A-N, minima, side lobes, or a portion of the main lobe with the predefined signal strength less than the maxima of the protected signal 114 away from the target direction 116 and to the pre-specified direction.

Based on the determined change in direction of the target receiver device 106 relative to the protected signal generator device 104, the data signal generator 230 may modify the protected signal 114 in accordance with the interference protection configuration 212. Using the new target direction 116 or the new target area, the data signal generator 230 may modify the protected signal 114 in accordance with the interception prevention configuration 212. In some embodiments, the data signal generator 230 may set the signal strength of the protected signal 114 to be greater than the detection threshold relative to the signal strength of the cover signal 108 along the new target direction 116. The data signal generator 230 may also set the signal strength of the protected signal 114 to be less than the signal strength of the protected signal 114 along the previous target direction 116. In some embodiments, the data signal generator 230 may set the main lobe of the protected signal 114 toward the new target direction 116 different from the previous target direction 116 or the new target area different from the previous target area. In some embodiments, the data signal generator 230 may set all of the nulls, minima, or side lobes with a predefined signal strength less than the maxima of the protected signal 114 away from the new target direction 116 different from the previous target direction 116 or the new target area different the previous target area.

In some embodiments, the data signal generator 230 may cause the transceiver circuit 226 to change the orientation of the set of antennae 228 based on the new target direction 116. In orienting the set of antennae 228, the data signal generator 230 may transmit the protected signal 114 to set the signal strength of the protected signal 114 to be greater than the detection threshold relative to the signal strength of the cover signal 108 along the new target direction 116. In some embodiments, the data signal generator 230 may orient the set of antennae 228 to set the main lobe of the protected signal 114 toward the new target direction 116 or the new target area. In some embodiments, the data signal generator 230 may orient the set of antennae 228 to set all of the nulls, minima, the side lobes away from the new target direction 116 or the new target area.

In response to detecting the additional target receiver 106, the data signal generator 230 may modify the protected signal 114 in accordance with the interference protection configuration 212. The data signal generator 230 may modify the protected signal 114 based on the target direction 116 of the additional target receiver 106. In some embodiments, the data signal generator 230 may set the signal strength of the protected signal 114 to be greater than the detection threshold relative to the signal strength of the cover signal 108 along the target direction 116 of the additional target receiver 106. The data signal generator 230 may set the signal strength of the protected signal 114 along the target direction 116 to be greater than the signal strengths of the protected signal 114 adjacent to the target direction 116 of the additional target receiver 106. In some embodiments, the data signal generator 230 may set one of the other lobes of the protected signal 114 toward the target direction 116 or the target area of the additional target receiver 106. In some embodiments, the data signal generator 230 may change the order of the protected signal 114 to generate additional lobes to cover the additional target receiver 106 as well as the initially covered target receiver 106. In some embodiments, the data signal generator 230 may set the one or more side lobes with a predefined signal strength less than the maxima of the protected signal 114 toward receiver devices 106 besides the target receiver device 106 and the additional target receiver device 106. In some embodiments, the data signal generator 230 may set all of the nulls 112, minima, or side lobes away from the target direction 116 or the target area of the initial target receiver device 106 and the additional target receiver device 106.

In some embodiments, the data signal generator 230 may cause the transceiver circuit 226 to change the orientation of the set of antennae 228 based on the new target direction 116. In orienting the set of antennae 228, the data signal generator 230 may transmit the protected signal 114 to set the signal strength of the protected signal 114 to be greater than the detection threshold relative to the signal strength of the cover signal 108 along the target directions 116 of the target receiver device 106 and the additional target receiver device 106. In some embodiments, the data signal generator 230 may orient the set of antennae 228 to set the one or more lobes of the protected signal 114 toward the target directions 116 or the target areas of the target receiver device 106 and the additional target receiver device 106. In some embodiments, the data signal generator 230 may orient the set of antennae 228 to all of the nulls 112A-N, minima, or side lobes with a predefined signal strength less than the maxima of the protected signal 114 away from the target directions 116 or the target areas of the target receiver device 106 and the additional target receiver device 106.

In conjunction with the generation and transmission of the cover signal 108 and the protected signal 114, the coordination handler 216 executing on each of the cover signal generator device 102, the protected signal generator device 104, and the coordinator device 240 may modify the signal properties of the cover signal 108 and the protected signal 114 in accordance with the interception prevention configuration 212. As discussed above, the interception prevention configuration 212 may specify coordination of the signal properties of the cover signal 108 and the protected signal 114 between the cover signal generator device 102 and the protected signal generator device 104. The signal properties may include the modulation, bandwidth, timing, and polarization, among others. The coordination handler 216 may identify one or more signal properties of the cover signal 108. The coordination handler 216 may identify one or more signal properties of the protected signal 114. In some embodiments, the coordination handler 216 may apply pattern recognition algorithms (e.g., k-means clustering) to determine the modulation of the cover signal 108 and/or the protected signal 114. In some embodiments, the coordination handler 216 may detect the cover signal 108 and/or the protected signal 114 within the electromagnetic spectrum and may determine the carrier frequency and the bandwidth of the cover signal 108 and/or the protected signal 114. In some embodiments, the coordination handler 216 may identify a time duration of the transmissions of the cover signal 108 and/or the protected signal 114 to determine the timing of the cover signal 108 and/or the protected signal 114. In some embodiments, the coordination handler 216 may apply pattern recognition algorithms in conjunctions with polarizing filters to determine the polarization of the cover signal 108 and/or the protected signal 114.

As discussed above, the coordination handler 216 may exchange information among the cover signal generator device 102, the protected signal generator device 104, and the coordinator device 240. The exchanged information may also include the one or more properties of the cover signal 108 and the protected signal 114. In some embodiments, the coordination handler 216 executing on the cover signal generator device 102 may provide or transmit the signal properties of the cover signal 108 to the protected signal generator device 104. In some embodiments, the coordinator handler 214 executing on the protected signal generator device 104 may provide or transmit the signal properties of the protected signal 114 to the cover signal generator device 102. In some embodiments, the coordination handler 216 executing on the coordinator device 240 may provide or transmit the one or more signal properties of the cover signal 108 to the protected signal generator device 104. The coordination handler 216 executing on the coordinator device 240 may also provide or transmit the one or more signal properties of the protected signal 114 to the cover signal generator device 102.

Based on the signal properties of the protected signal 114, the interference signal generator 218 may set or modify the cover signal 108 in accordance with the interception prevention configuration 212. In some embodiments, the interference signal generator 218 may set or modify the signal properties of the cover signal 108 based on the signal properties of the protected signal 114. In some embodiments, the interception prevention configuration 212 may specify that the signal properties of the cover signal 108 be the same as the signal properties of the protected signal 114 (e.g., same modulation, bandwidth, and timing). The interference signal generator 218 may set or modify the signal properties of the cover signal 108 to be the same as the signal properties of the protected signal 114. In some embodiments, the interception prevention configuration 212 may specify that the signal properties of the cover signal 108 differ at least partially from the signal properties of the protected signal 114 (e.g., orthogonal polarity or different modulation, timing, and bandwidth). The interference signal generator 218 may set or modify the signal properties of the cover signal 108 to differ from the signal properties of the protected signal 114. In some embodiments, the interference signal generator 218 may determine a difference measure between the signal properties of the cover signal 108 and the protected signal 114. The difference measure may indicate a degree of variance between the signal properties of the cover signal 108 and the signal properties of the protected signal 114. Based on the difference measure and the specifications of the interception prevention configuration 212, the interference signal generator 218 may set or modify the signal properties of the cover signal 108.

In some embodiments, the interference signal generator 218 executing on one cover signal generator device 102 (a first cover signal generator device 102A) may set or modify a first cover signal 108A based on signal properties of a second cover signal 108B transmitted by another cover signal generator device 102 (a second cover signal generator device 102B). As discussed above, the interception prevention configuration may specify signal properties (e.g., modulation, bandwidth, timing, and polarization) for each cover signal 108. In some embodiments, the interception prevention configuration 212 may specify that the signal properties of the first cover signal 108A be the same as the signal properties of the second cover signal 108B (e.g., same modulation, bandwidth, and timing). The interference signal generator 218 executing on the first cover signal generator device 102A may set or modify the signal properties of the first cover signal 108A to be the same as the signal properties of the second cover signal 108B. In some embodiments, the interception prevention configuration 212 may specify that the signal properties of the first cover signal 108A differ at least partially from the signal properties of the second cover signal 108B (e.g., orthogonal polarity or different modulation, timing, and bandwidth). The interference signal generator 218 may set or modify the signal properties of the first cover signal 108A to differ from the signal properties of the second cover signal 108B. In some embodiments, the interference signal generator 218 may determine a difference measure between the signal properties of the cover signal 108 and the protected signal 114. The difference measure may indicate a degree of variance between the signal properties of the first cover signal 108A and the signal properties of the second cover signal 108B. Based on the difference measure and the specifications of the interception prevention configuration 212, the interference signal generator 218 may set or modify the signal properties of the first cover signal 108A relative to the second cover signal 108B. Based on the signal properties of the cover signal 108, the data signal generator 230 may set or modify the protected signal 114 in accordance with the interception prevention configuration 212. In some embodiments, the data signal generator 230 may set or modify the signal properties of the protected signal 114 based on the signal properties of the cover signal 108. In some embodiments, the interception prevention configuration 212 may specify that the signal properties of the protected signal 114 be the same as the signal properties of the cover signal 108 (e.g., same modulation, bandwidth, and timing). The data signal generator 230 may set or modify the signal properties of the protected signal 114 to be the same as the signal properties of the cover signal 108. In some embodiments, the interception prevention configuration 212 may specify that the signal properties of the protected signal 114 differ at least partially from the signal properties of the cover signal 108 (e.g., orthogonal polarity or different modulation, timing, and bandwidth). The data signal generator 230 may set or modify the signal properties of the protected signal 114 to differ from the signal properties of the cover signal 108. In some embodiments, the data signal generator 230 may determine a difference measure between the signal properties of the protected signal 114 and the cover signal 108. The difference measure may indicate a degree of variance between the signal properties of the protected signal 114 and the signal properties of the cover signal 108. Based on the difference measure and the specifications of the interception prevention configuration 212, the data signal generator 230 may set or modify the signal properties of the protected signal 114.

In some embodiments, the data signal generator 230 executing on one protected signal generator device 104 (a first protected signal generator device 104A) may set or modify a first protected signal 114A based on signal properties of a second protected signal 114B transmitted by another protected signal generator device (a second protected signal generator device 104B). As discussed above, the interception prevention configuration may specify signal properties (e.g., modulation, bandwidth, timing, and polarization) for each protected signal 114. In some embodiments, the interception prevention configuration 212 may specify that the signal properties of the first protected signal 114A be the same as the signal properties of the second protected signal 114B (e.g., same polarization). The data signal generator 230 executing on the first protected signal generator device 104A may set or modify the signal properties of the first protected signal 114A to be the same as the signal properties of the second protected signal 114B. In some embodiments, the interception prevention configuration 212 may specify that the signal properties of the first protected signal 114A differ at least partially from the signal properties of the second protected signal 114B (e.g., orthogonal polarity or different modulation, timing, and bandwidth). The data signal generator 230 may set or modify the signal properties of the first protected signal 114A to partially differ from the signal properties of the second protected signal 114B. For example, the data signal generator 230 executing on the first protected signal generator 104A may generate and transmit the first protected signal 114A at a first time window, while the data signal generator 230 executing on the second protected signal generator 104B generates and transmits the second protected signal 114B at a second time window. The first time window and the second time window may be interleaved. In some embodiments, the data signal generator 230 may determine a difference measure between the signal properties of the protected signal 114 and the protected signal 114. The difference measure may indicate a degree of variance between the signal properties of the first protected signal 114A and the signal properties of the second protected signal 114B. Based on the difference measure and the specifications of the interception prevention configuration 212, the data signal generator 230 may set or modify the signal properties of the first protected signal 114A relative to the second protected signal 114B.

The data signal parser 238 executing the target receiver device 106 may receive the protected signal 114 from the protected signal generator device 104. The data signal parser 238 may also avoid the interference from the cover signal 108 from the cover signal generator device 102. In some embodiments, the data signal parser 238 may use demodulation techniques to recover the protected signal 114 from the cover signal 108. The demodulation techniques may include de-spreading in direct sequence spread spectrum (DSSS), decoding in code-division multiple access (CDMA), and decoding in frequency hopping, among others, or any combination thereof. In some embodiments, the data signal parser 238 may receive multiple protected signals 114 from multiple protected signal generator devices 104. The data signal parser 238 may use a combination of the multiple protected signals 114 to separate the protected signals 114 from the one or more cover signals 108. In some embodiments, the data signal parser 238 may use a combination of the multiple protected signals 114 to recover data encoded among the multiple protected signals 114. As the target receiver device 106 does not receive the cover signal 108 while other receiver devices 106, the data signal parser 238 may successfully decode the data included in the protected signal 114. In contrast, the data signal parser 238 executing on the receiver devices 106 besides the target receiver device 106 may receive the cover signal 108. The data signal parser 238 in such receiver devices 106 may pick up the noise or interference in the cover signal 108 and may not receive the protected signal 114. Even if these receiver devices 106 receive the protected signal 114, it may be difficult for the data signal parser 238 executing on receiver devices 106 besides the target receiver device 106 to successfully separate the protected signal 114 from the cover signal 108, due to the signal properties of these two signals 108 and 114. In this manner, other receiver devices 106 besides the one or more target receiver device 106 may be unable to or at least less likely to intercept and successfully decode the data encoded in the protected signal 114.

Figure 3A:
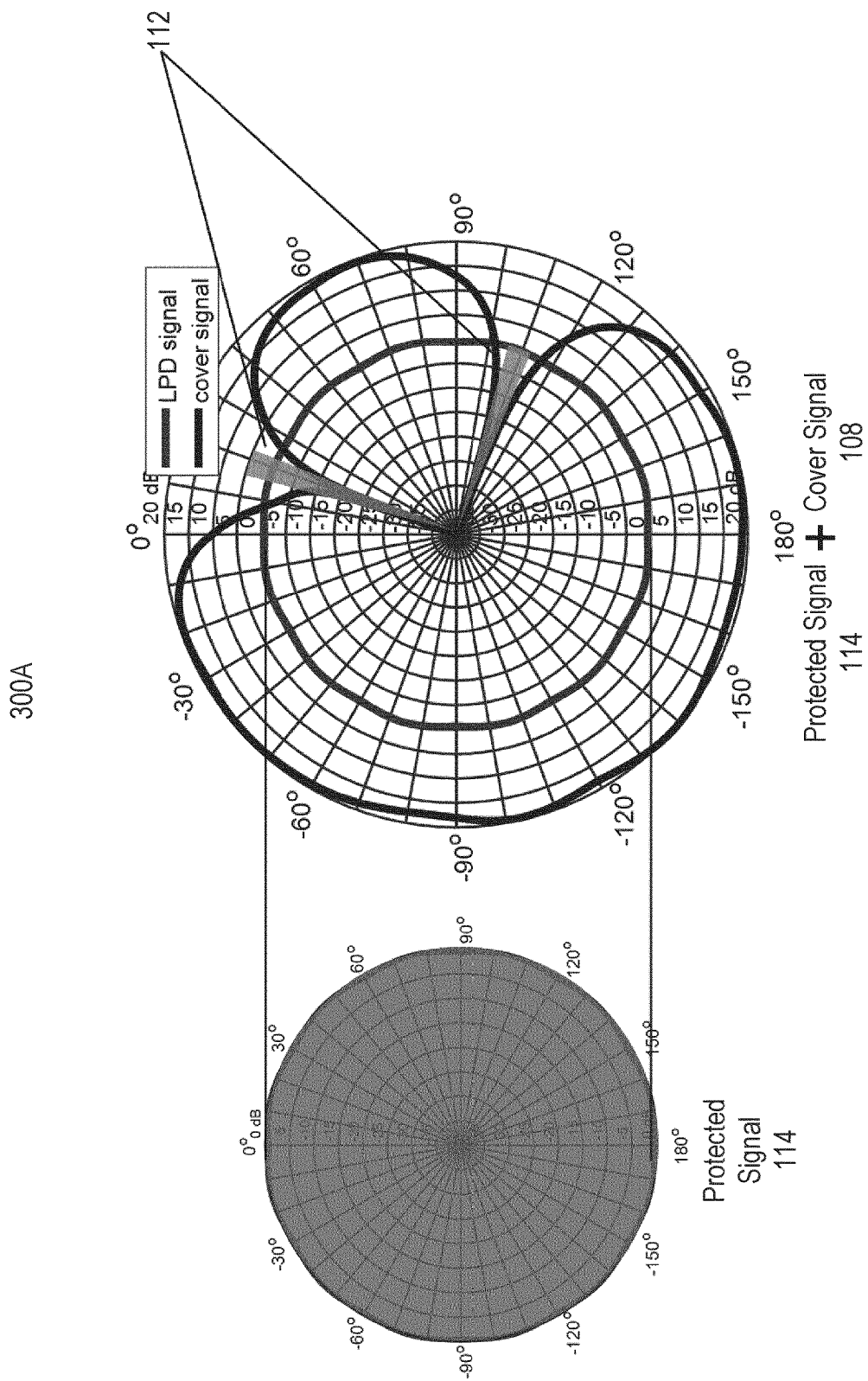

Referring now to FIG. 3A, depicted is a polar diagram of radiation patterns 300A emitted by a cover signal generator device and a protected signal generator device of the system for preventing interception of RF signals. In the radiation pattern 300A, the protected signal 114 may be an omnidirectional signal transmitted by the protected signal generator device 104. The cover signal 108 may be a directional signal with two nulls 112 transmitted by the cover signal generator device 102 (e.g., using a circular array antenna). The protected signal 114 by itself may be susceptible to interception from all azimuth angles. With the addition of the cover signal 108, the susceptibility may be reduced to areas around the two nulls 112 within the cover signal 108.

Referring now to FIG. 3B, depicted is a polar diagram of radiation patterns 300B emitted by a cover signal generator device and a protected signal generator device of the system for preventing interception of RF signals. In the radiation pattern 300B, the protected signal 114 may be a directional signal transmitted by the protected signal generator 104 (e.g., using a 4×1 planar array antennae). Furthermore, the cover signal 108 may be a directional signal transmitted by the cover signal 108 may also be a directional signal transmitted by the cover signal generator device 102 (e.g., using a 2×1 planar array antennae). The protected signal 114 by itself may be susceptible to interception at three regions 305, each at different radii from the protected signal generator device 104. The cover signal 108 may have at least one null 112 along the region 305 with the greater radius. With the addition of the cover signal 108, the susceptibility of the protected signal 114 to intercept may be reduced to the null 112 within the cover signal 108.

Figure 4A:
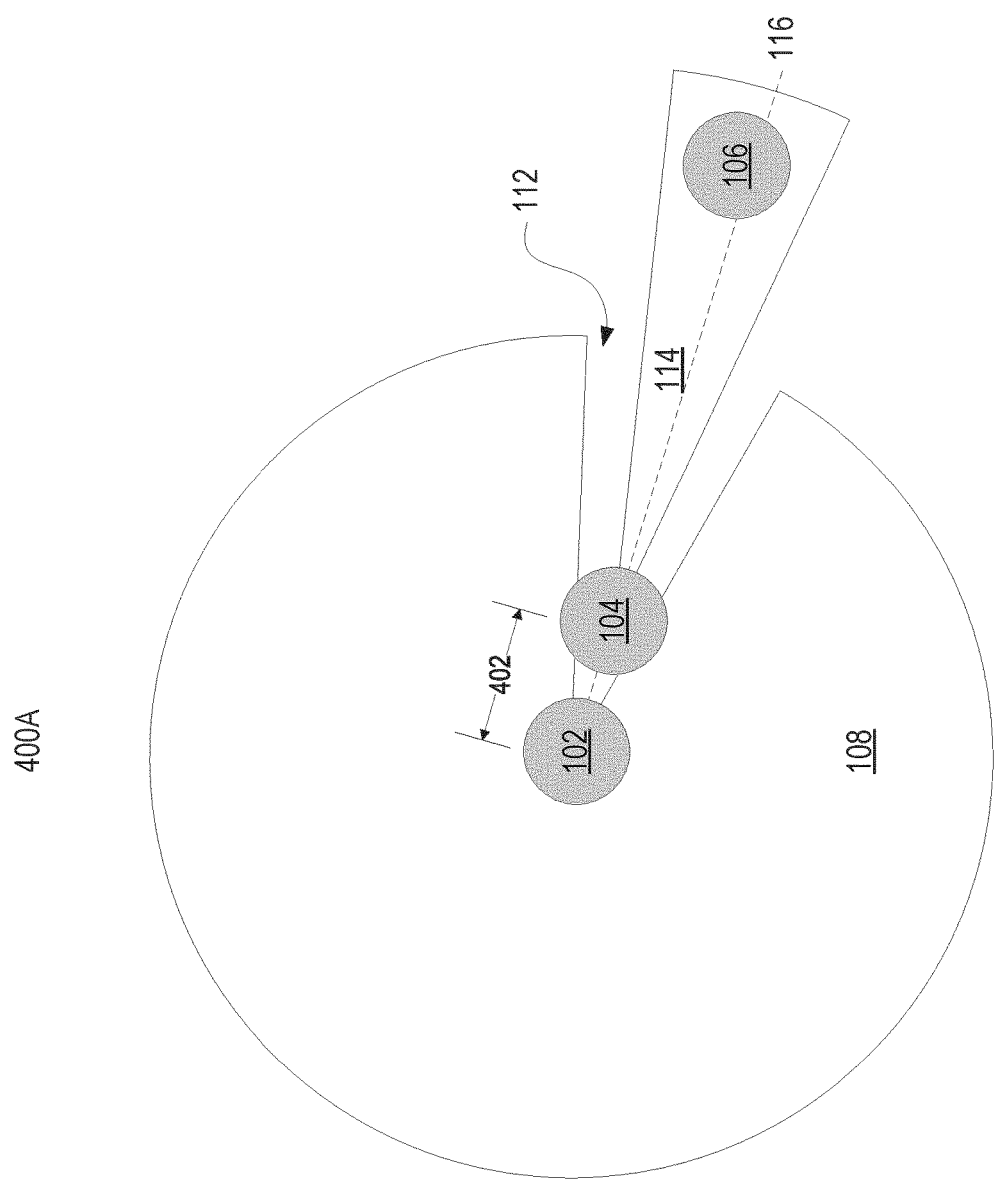
FIGS. 4A-D show polar diagrams of radiation patterns emitted by a cover signal generator device and a protected signal generator device of the system for preventing interception of RF signals, in accordance with some embodiments of the inventive concepts disclosed herein.

Referring now to FIG. 4A, depicted is a polar diagram of radiation pattern 400A emitted by a cover signal generator device and a protected signal generator device of the system for preventing interception of RF signals. It should be noted that the shapes of the radiation pattern 400A of the cover signal 108 and the protected signal 114 with sharp quadrant corners as depicted is an illustrative representation. In the radiation pattern 400A, the cover signal generator device 102 and the protected signal generator device 104 may not be co-located separated by distance 402 but may be co-aligned along the target direction 116 with the target receiver device 106. In accordance with the interception prevention configuration 212, the cover signal generator device 102 may generate and transmit the cover signal 108 with one null 112 along the target direction 116. Within the null 112 of the cover signal 108, the protected signal generator 104 may generate and transmit the protected signal 114 with a main lobe along the target direction 116 toward the target receiver device 106.

Figure 4B:
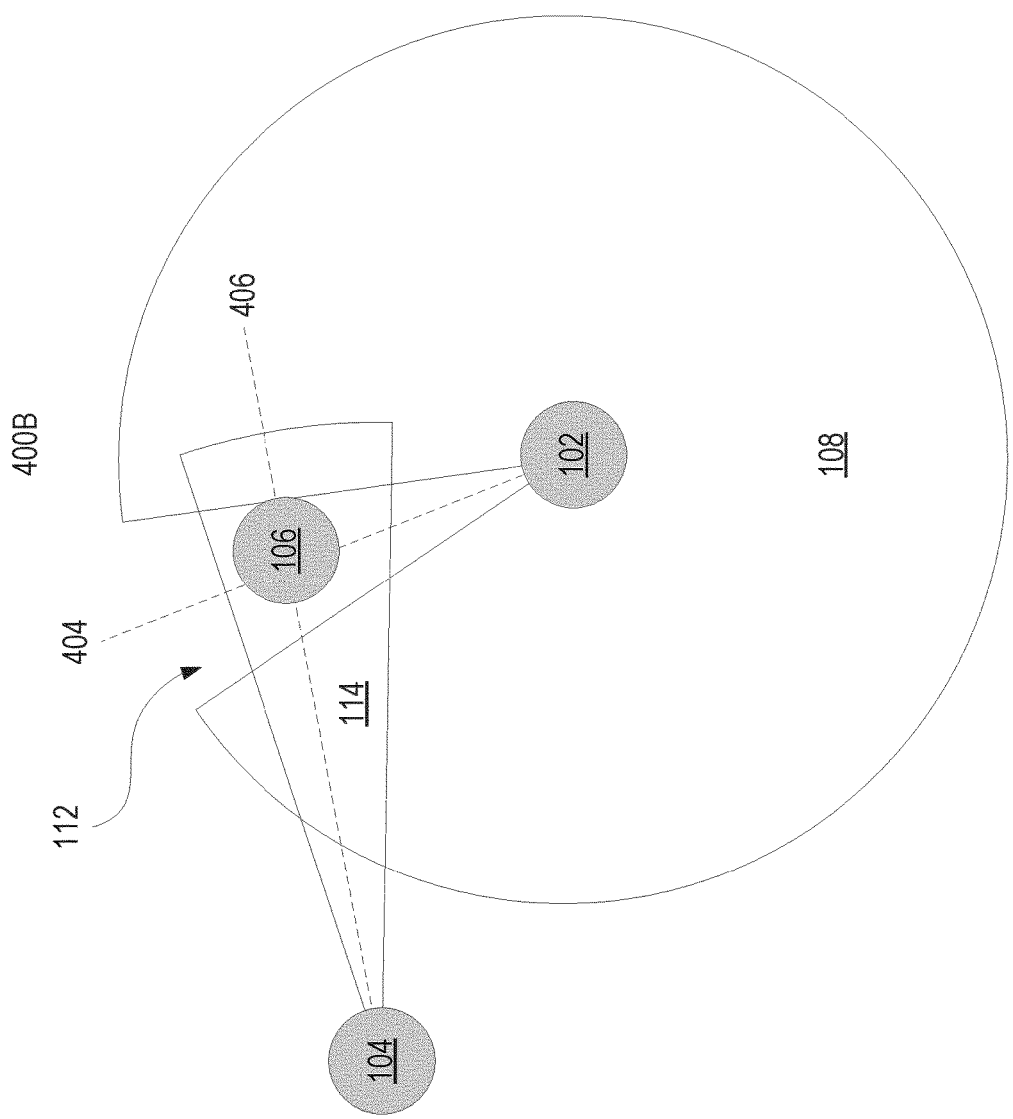

Referring now to FIG. 4B, depicted is a polar diagram of radiation pattern 400B emitted by a cover signal generator device and a protected signal generator device of the system for preventing interception of RF signals. It should be noted that the shapes of the radiation pattern 400B of the cover signal 108 and the protected signal 114 with sharp quadrant corners as depicted is an illustrative representation. In the radiation pattern 400B, the cover signal generator device 102 and the protected signal device 104 may not be co-located and may not be co-aligned with the target receiver device 106. As such, a target direction 404 for the cover signal generator device 102 with respect to the target receiver device 106 may differ from a target direction 406 for the protected signal generator device 104 with respect to the target receiver device 106. The cover signal generator device 102 and the protected signal generator device 104 may each determine a target area generally about the target receiver device 106, and may correspond to the intersection of the target direction 404 and the target direction 406. With these determinations, the cover signal generator device 102 may generate and transmit the cover signal 108 with the null 112 along the target direction 404. The protected signal generator device 104 may generate and transmit the protected signal 114 with the maximum along the target direction 406

Figure 4C:
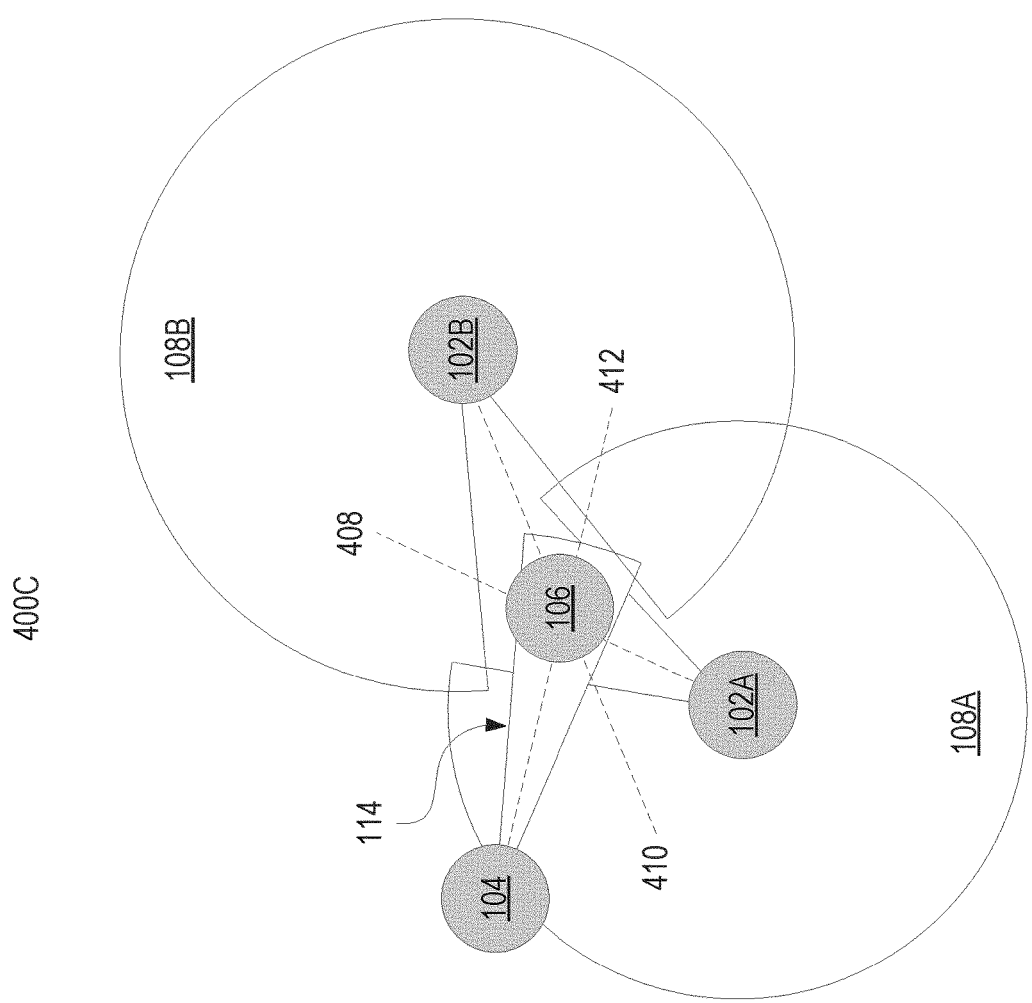

Referring now to FIG. 4C, depicted is a polar diagram of radiation pattern 400C emitted by a cover signal generator device and a protected signal generator device of the system for preventing interception of RF signals. It should be noted that the shapes of the radiation pattern 400C of the cover signal 108 and the protected signal 114 with sharp quadrant corners as depicted is an illustrative representation. In the radiation pattern 400C, there may be two cover signal generator devices 102A and 102B, the protected signal generator device 104, and the target receiver device 106. As such, the target directions for the cover signal generator devices 102A and 102B and the protected signal generator device 104 may differ from one another. The first cover signal generator device 102A may determine a target direction 408 with respect to the target receiver device 106. The second cover signal generator device 102B may determine a target direction 410 with respect to the target receiver device 106. The protected signal generator device 104 may determine a target direction 412 with respect to the target receiver device 106. The cover signal generator devices 102A and 102B and the protected signal generator device 104 may each determine a target area generally about the target receiver device 106, and may correspond to the intersection of the target directions 408-412. With these determinations, the first cover signal generator 102A may generate and transmit a first cover signal 108A with a null toward the target direction 408. The second cover signal generator 102B may generate and transmit a second cover signal 108B with a null toward the target direction 410. The protected signal generator device 104 may generate and transmit the protected signal 114 with a maximum along the target direction 412.

Figure 4D:
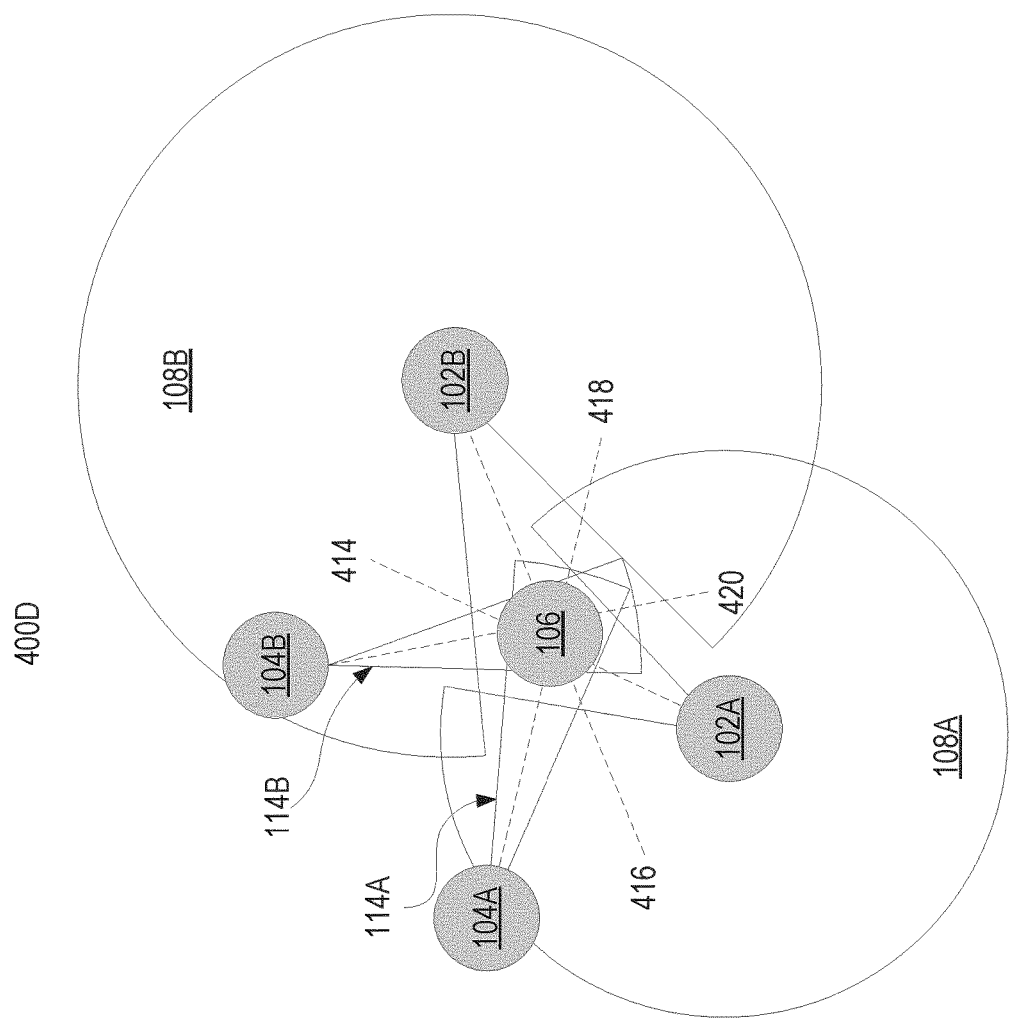

Referring now to FIG. 4D, depicted is a polar diagram of radiation pattern 400D emitted by a cover signal generator device and a protected signal generator device of the system for preventing interception of RF signals. It should be noted that the shapes of the radiation pattern 400D of the cover signal 108 and the protected signal 114 with sharp quadrant corners as depicted is an illustrative representation. In the radiation pattern 400D, there may be two cover signal generator devices 102A and 102B, two protected signal generator 104A and 104B, and the target receiver device 106. The radiation pattern 400D may be similar to the radiation pattern 400C, except with two protected signal generator devices 104A and 104B. The first cover signal generator device 102A may determine a target direction 414 with respect to the target receiver device 106. The second cover signal generator device 102B may determine a target direction 416 with respect to the target receiver device 106. The first protected signal generator device 104A may determine a target direction 418 with respect to the target receiver device 106. The second protected signal generator device 104B may determine a target direction 420 with respect to the target receiver device 106. With these determinations, the first cover signal generator 102A may generate and transmit a first cover signal 108A with a null toward the target direction 414. The second cover signal generator 102B may generate and transmit a second cover signal 108B with a null toward the target direction 416. The first protected signal generator device 104A may generate and transmit the first protected signal 114A with a maximum along the target direction 418. The second protected signal generator device 104B may generate and transmit the first protected signal 114B with a maximum along the target direction 420. In accordance with the interception prevention configuration 212, the first protected signal 114A and the second protected signals 114B may be generated with the same polarization. In this manner, the target receiver device 106 may resolve the two protected signals 114A and 114B to recover the data encoded therein.

Referring now to FIG. 5A, depicted is a flow diagram of method 500 of preventing interception of radiofrequency (RF) signals. The method 500 may be performed or implemented using any of the above mentioned components or devices of FIGS. 1-4C, such as the cover signal generator device 102. In brief overview, a cover signal generator may identify a direction of a target receiver (502). The cover signal generator may generate a cover signal (504). The cover signal generator may transmit the cover signal (506). The cover signal generator may coordinate with a protected signal generator (508).

In further detail, the cover signal generator may identify a direction of a target receiver (502). The cover signal generator may use various sensing techniques to determine or identify the direction of the target receiver. The sensing techniques may include radar (e.g., monostatic or multistatic), monopulse array processing, and multi-antennae algorithms (e.g., estimation of signal parameters via rotational invariance techniques (ESPRIT) and multiple signal classification (MUSIC)), among others. The cover signal generator may also receive a location identifier from the target receiver. The cover signal generator may identify a location identifier for itself. Using the two location identifiers, the cover signal generator may determine the direction toward the target receiver.

The cover signal generator may generate a cover signal (504). Using the direction to the target receiver, the cover signal generator may generate the cover signal in accordance with an interception prevention configuration. A signal strength of the cover signal may be specified by the interception prevention configuration to be less than a detection threshold relative to a signal strength of a protected signal along the direction. The detection threshold may correspond to a relative signal strength at which the protected signal is recoverable from the cover signal. The cover signal may have a null (e.g., one of minima) along the direction to the target receiver. The signal strength of the cover signal along the direction may be less than the signal strengths in adjacent directions. The cover signal may have a maximum away from the direction of the target receiver.

The cover signal generator may transmit the cover signal (506). Using a set of antennae, the cover signal generator may transmit the cover signal generated using the direction to the target receiver in accordance with the interception prevention configuration. The cover signal may be a directional or an omnidirectional signal. The cover signal generator may orient the set of antennae to position the nulls or minima along the direction toward the target receiver. The cover signal generator may also orient the set of antennae to position the maxima away from the direction to the target receiver.

The cover signal generator may coordinate with a protected signal generator (508). As the cover signal generator is transmitting the cover signal, the protected signal generator may generate and transmit the protected signal along the direction to the target receiver. The cover signal generator may identify signal properties of the protected signal, such as modulation, bandwidth, and timing. The cover signal generator may modify or set signal properties of the cover signal based on the signal properties of the protected signal in accordance with the interception prevention configuration. The cover signal generator may set the signal properties of the cover signal to be the same as or differ from the signal properties of the protected signal.

Referring now to FIG. 5B, depicted is a flow diagram of method 510 of preventing interception of radiofrequency (RF) signals. The method 510 may be performed or implemented using any of the above mentioned components or devices of FIGS. 1-4C, such as the protected signal generator device 104. In brief overview, a protected signal generator may identify a direction of a target receiver (512). The protected signal generator may generate a protected signal (514). The protected signal generator may transmit the protected signal (516). The protected signal generator may coordinate with a cover signal generator (518).

In further detail, the protected signal generator may identify a direction of a target receiver (512). The protected signal generator may use sensing techniques to determine the direction of the target receiver. The sensing techniques may include radar (e.g., monostatic or multistatic), monopulse array processing, and multi-antennae algorithms (e.g., estimation of signal parameters via rotational invariance techniques (ESPRIT) and multiple signal classification (MUSIC)), among others. The protected signal generator may also receive a location identifier from the target receiver. The protected signal generator may identify a location identifier for itself. Using the two location identifiers, the protected signal generator may determine the direction toward the target receiver.

The protected signal generator may generate a protected signal (514). Using the direction to the target receiver, the protected signal generator may generate the protected signal in accordance with an interception prevention configuration. A signal strength of the protected signal may be specified by the interception prevention configuration to be greater than a detection threshold relative to a signal strength of a cover signal along the direction. The detection threshold may correspond to a relative signal strength at which the protected signal is recoverable from the cover signal. The protected signal may have a null or one of minima away from the direction to the target receiver. The signal strength of the protected signal along the direction may be greater than the signal strengths in adjacent directions. The protected signal may have a null or minima away from the direction of the target receiver.

The protected signal generator may transmit the protected signal (516). Using a set of antennae, the protected signal generator may transmit the protected signal generated using the direction to the target receiver in accordance with the interception prevention configuration. The protected signal may be a directional or an omnidirectional signal. The protected signal generator may orient the set of antennae to position the nulls or minima away from the direction toward the target receiver. The protected signal generator may also orient the set of antennae to position the maximum along the direction to the target receiver.

The protected signal generator may coordinate with a cover signal generator (518). As the protected signal generator is transmitting the protected signal, the cover signal generator may generate and transmit the cover signal away from the direction to the target receiver. The protected signal generator may identify signal properties of the cover signal, such as modulation, bandwidth, and timing. The protected signal generator may modify or set signal properties of the protected signal based on the signal properties of the cover signal in accordance with the interception prevention configuration. The protected signal generator may set the signal properties of the protected signal to be the same as or differ from the signal properties of the cover signal.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A system for preventing interception of radiofrequency (RF) signals, comprising:
    a first transmitter device having a first set of antennae configured to transmit a first RF signal in plurality of directions, the first RF signal having a first signal strength in a target direction less than in directions adjacent to the target direction; and
    a second transmitter device having a second set of antennae configured to transmit a second RF signal to a target receiver according to an interception prevention configuration, the interception prevention configuration comprising having the target receiver located along the target direction and the second RF signal having a second signal strength greater than a detection threshold relative to the first signal strength along the target direction.

2. The system of claim 1, wherein the first transmitter device is further configured to transmit the first RF signal according to the interception prevention configuration to provide interference to a second receiver different from the target receiver to prevent the second receiver from intercepting the second RF signal.

3. The system of claim 1, wherein the first transmitter device is further configured to determine the target receiver along the target direction and to generate the first RF signal having the first signal strength in the target direction according to the interception prevention configuration based on the determination of the target receiver in the target direction; and
    wherein the second transmitter device is further configured to determine the target receiver along the target direction and to generate the second RF signal having the second signal strength in the target direction according to the interception prevention configuration based on the determination of the target receiver in the target direction.

4. The system of claim 1, wherein the first transmitter device is further configured to detect, subsequent to the transmission of the first RF signal, a second target receiver along a second target direction and to modify the first RF signal having a third signal strength in the second target direction less than in direction adjacent to the second target direction; and further comprising:
    a third transmitter device having a third set of antennae configured to transmit a third RF signal to a second target receiver according to the interception prevention configuration, the interception prevention configuration comprising having the second target receiver located along the second target direction and the third RF signal having a fourth signal strength greater than a second detection threshold relative to the third signal strength along the second target direction.

5. The system of claim 1, wherein the second transmitter device is further configured to dither the second RF signal to set the second signal strength of the second RF signal to be less than the detection threshold relative to the first RF signal for a predetermined period of time.

6. The system of claim 1, wherein at least one of the first transmitter device or the second transmitter device is further configured to modify at least one of a modulation, a frequency, or a timing of the first RF signal or the second RF signal according to the interception prevention configuration.

7. The system of claim 1, wherein the first transmitter device and the second transmitter device are co-located.

8. A transmitter device for preventing interception of radiofrequency (RF) signals, comprising:
    a control circuit having one or more processors and memory, configured to identify a target receiver located along a target direction and to generate a first RF signal having a first signal strength greater than a detection threshold relative to a second signal strength of a second RF signal generated by a cover signal generator device along the target direction according to an interception prevention configuration, the second RF signal having the second signal strength in the target direction less than in directions adjacent to the target direction; and
    a transceiver circuit coupled to the control circuit, configured to transmit, via a set of antennae, the first RF signal to the target receiver located along the target direction.

9. The transmitter device of claim 8, wherein the control circuit is further configured to transmit the first RF signal according to the interception prevention configuration to provide data to the target receiver located along the target direction to prevent a second receiver located outside the target direction from intercepting the second RF signal.

10. The transmitter device of claim 8, wherein the control circuit is further configured to determine a change in direction of the target receiver different from the target direction and to modify the first RF signal based on the change of direction according the interception prevention configuration.

11. The transmitter device of claim 8, wherein the control circuit is further configured to determine a target area in which the target receiver is located and identify the target direction for transmission of the first RF signal based on the target area, the first RF signal having the first signal strength greater than the detection threshold relative to the second signal strength within the target area.

12. The transmitter device of claim 8, wherein the control circuit is further configured to receive the target direction for transmission of the first RF signal from a central coordinator device according to the interception prevention configuration.

13. The transmitter device of claim 8, wherein the control circuit is further configured to identify a signal property of the second RF signal and modify at least one of a modulation, a frequency, or a timing the first RF signal according to the interception prevention configuration based on the signal property of the second RF signal.

14. The transmitter device of claim 8, wherein the transceiver circuit is further configured to transmit, via the set of antennae, the first RF signal including at least one of an omnidirectional signal or a directional signal.

15. A transmitter device for preventing interception of radiofrequency (RF) signals, comprising:
- a control circuit having one or more processors and memory, configured to identify a target receiver located along a target direction and to generate a first RF signal having a first signal strength less than a recovery threshold relative to a second signal strength of a second RF signal generated by a protected signal generator device along the target direction according to an interception prevention configuration; and
- a transceiver circuit coupled to the control circuit, configured to transmit, via a set of antennae, the first RF signal having the first signal strength along the target direction less than along a plurality of directions adjacent to the target direction.

16. The transmitter device of claim 15, wherein the control circuit is further configured to transmit the first RF signal according to the interception prevention configuration to provide interference to a second receiver different from the target receiver to prevent the second receiver from intercepting the second RF signal.

17. The transmitter device of claim 15, wherein the control circuit is further configured to determine an avoidance direction along which a second receiver different from the target receiver is located and to modify the first RF signal based on the avoidance direction.

18. The transmitter device of claim 15, wherein the control circuit is further configured to determine a target area in which the target receiver is located and identify the target direction for transmission of the first RF signal based on the target area, the first RF signal having the first signal strength less than the recovery threshold relative to the second signal strength within the target area.

19. The transmitter device of claim 15, wherein the control circuit is further configured to identify a signal property of the second RF signal and modify at least one of a modulation, a frequency, or a timing the first RF signal according to the interception prevention configuration based on the signal property of the second RF signal.

20. The transmitter device of claim 15, wherein the transceiver circuit is further configured to transmit, via the set of antennae, the first RF signal including a directional signal having one or more lobes and one or more minima, at least one of the minima having the first signal strength.

* * * * *